US006456747B2

(12) United States Patent
Altman

(10) Patent No.: US 6,456,747 B2
(45) Date of Patent: *Sep. 24, 2002

(54) SYSTEMS, PROCESSES AND PRODUCTS FOR STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS

(75) Inventor: Gerald Altman, Auburndale, MA (US)

(73) Assignee: Papercomp, Inc., Newton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/859,795

(22) Filed: May 17, 2001

Related U.S. Application Data

(63) Continuation-in-part of application No. 08/882,833, filed on Jun. 26, 1997, now Pat. No. 6,236,767.
(60) Provisional application No. 60/020,902, filed on Jun. 27, 1996.

(51) Int. Cl.$^7$ .............................. G06K 9/54; G06K 9/60
(52) U.S. Cl. ...................... 382/305; 382/305; 382/306; 707/2; 707/10; 707/200; 707/204
(58) Field of Search ............................... 382/305, 306; 707/2, 10, 200, 204

(56) References Cited

U.S. PATENT DOCUMENTS

| 5,813,009 A | * | 9/1998 | Johnson et al. ............. 707/100 |
| 5,913,205 A | * | 6/1999 | Jain et al. ...................... 707/2 |
| 6,052,494 A | * | 4/2000 | Ohtani ........................ 382/306 |

* cited by examiner

Primary Examiner—Leo Boudreau
Assistant Examiner—Gregory Desire
(74) Attorney, Agent, or Firm—Morse, Altman & Martin

(57) ABSTRACT

Newly received or generated paper documents of different content classifications are simply scanned under the control of a digital processor at random in date/time order to produce corresponding electronic images. Each paper document and its electronic image are automatically assigned a unique date/time identifier. No matter how the paper documents are classified, they simply are stacked in sequential folders, which in turn are stacked in sequential boxes. The folders and boxes are marked with the ranges of the date/time identifiers that have been assigned. The digital processor creates records that specify the classifications and the date/time identifiers of the documents. The digital processor then: can provide sets of electronic images that belong to selected content classifications for working purposes, and can indicate the locations of the paper documents in the folders and boxes whenever the need arises.

50 Claims, 25 Drawing Sheets

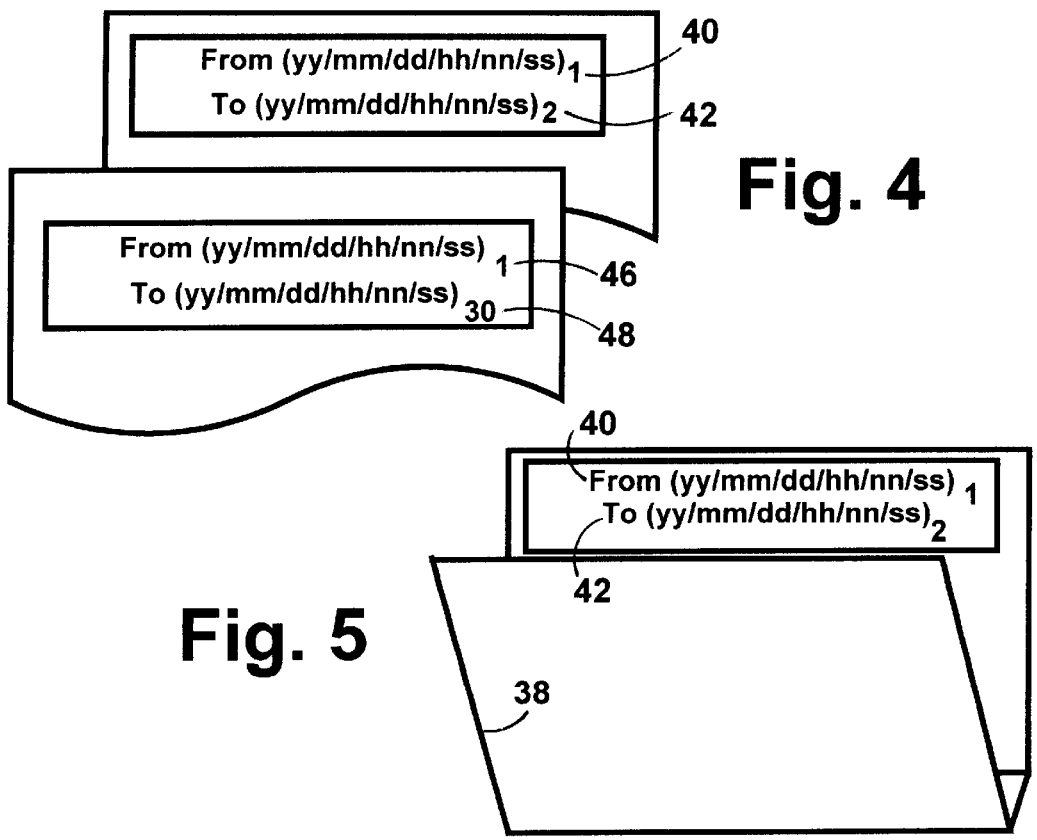
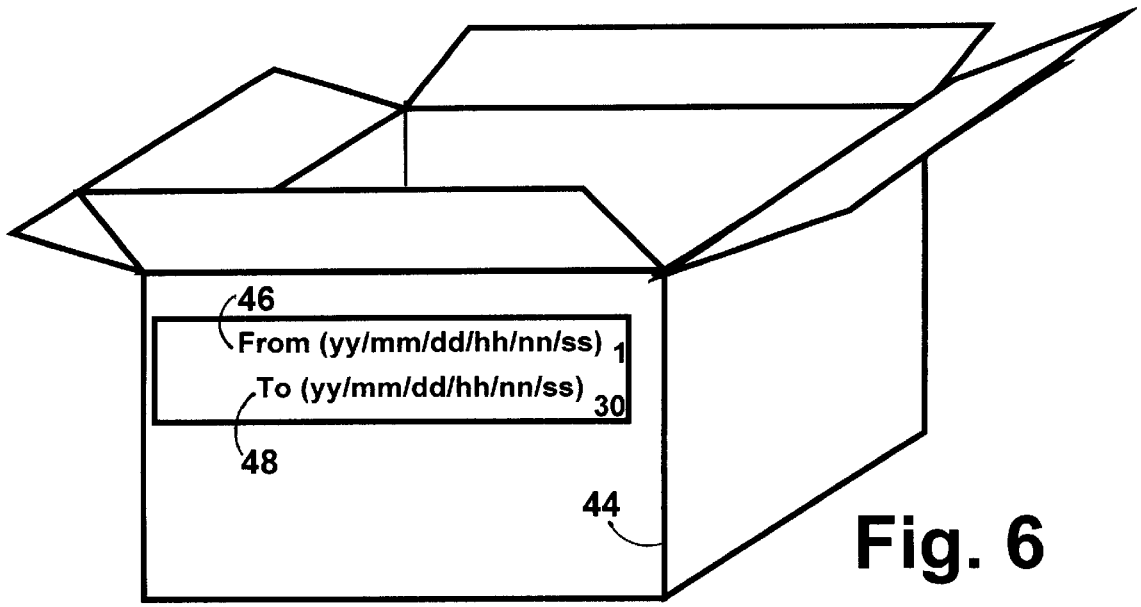

Entity Code Table

| Field_Name | Data_Type | Field_Relation | Description (discretionary omissions for simplicity) |
|---|---|---|---|
| Record_Number | Text | Secondary | Sequential Auto Number |
| Main_Code_ID | Text | Primary | Key field – no duplicates |
| Main_Code_Class | Text | Secondary | Select one of: customer, client, patient |
| Info | Block | Secondary | Type any desired information |
| Name | Text | Secondary | |
| Street | Text | Secondary | |
| City | Text | Secondary | |
| State/Country | Text | Secondary | |
| Zip_Code | Text | Secondary | |
| Telephone_No | Text | Secondary | |
| Fax_No | Text | Secondary | |
| EMail | Text | Secondary | |
| Cell_Phone | Text | Secondary | |
| Citizenship | Text | Secondary | Country/ state of incorporation |
| Related_Code_ID | Text | Secondary | Main Code ID, duplicates OK |
| Related_Code_Class | Text | Secondary | Select one of: contact, associate, adverse party |

Fig. 7a

Document Entry Table

| Field_Name | Data_Type | Field_Relation | Description (discretionary omissions for simplicity) |
|---|---|---|---|
| Record_Number | Text | Secondary | |
| Doc_Entry_Date_Time | DateTime | Primary | |
| Doc_Entry_Location | Text | Secondary | |
| Doc_Storage_Disk | Text | Secondary | |
| Main_Code_ID | Text | Secondary | |
| Our_File_No | Text | Secondary | |
| Doc_Author/Source | Text | Secondary | |
| Doc_Addressee | Text | Secondary | |
| Doc_Date_Sent/Published | Text | Secondary | |
| Doc_Whole/Part | Text | Secondary | |
| Doc_View | Text | Secondary | |

Fig. 8a

File Table

| Field_Name | Data_Type | Field_Relation | Description (discretionary omissions for simplicity) |
|---|---|---|---|
| Record_Number | Text | Secondary | |
| File_Name | Text | Secondary | |
| File_Kind | Text | Secondary | |
| Our_File_No | Text | Primary | |
| Other_File | Text | Secondary | |
| Our_File_No | Text | Secondary | |
| Date_File_Opened | Text | Secondary | |
| Date_File_Closed | Text | Secondary | |
| Official_No | Text | Secondary | |
| Official_Date | Text | Secondary | |
| Country/State | Text | Secondary | |
| Security_Level | Text | Secondary | |

Fig. 9a

Task Table

| Field_Name | Data_Type | Field_Relation | Description (discretionary omissions for simplicity) |
|---|---|---|---|
| Record_Number | Text | Secondary | |
| Main_Code_ID | Text | Secondary | |
| Our_File_No | Text | Primary | |
| Task_Kind | Text | Secondary | |
| Task_Entry_Date | Text | Secondary | |
| Task_Due_Date | Text | Secondary | |
| Task_Done_Date | Text | Secondary | |

Fig. 10a

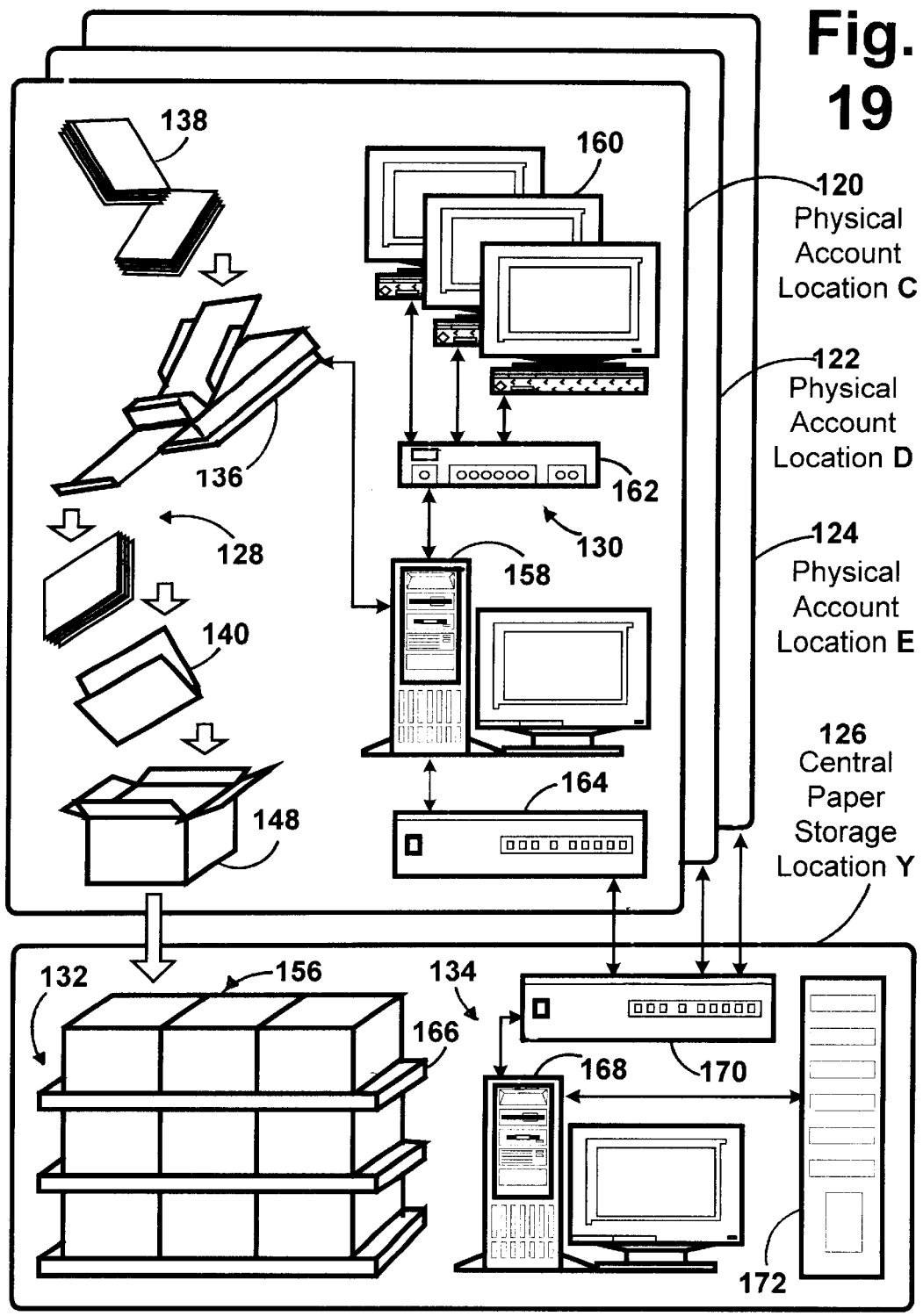

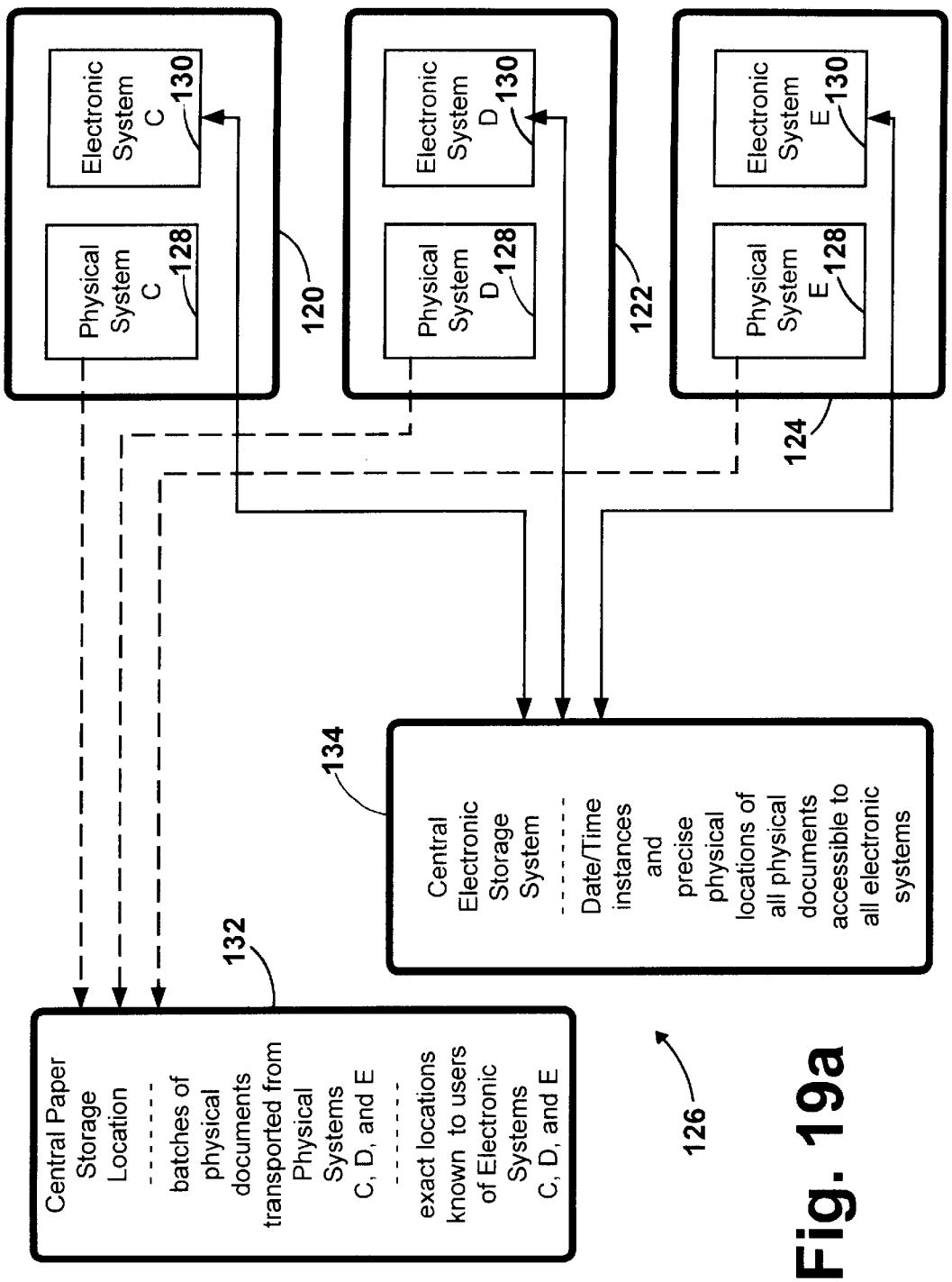

| Record Number | Main Code ID | FileNo | DocEntry Date/ Time | DocEntry Location | Doc Descrip- tion | DocView | |
|---|---|---|---|---|---|---|---|
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

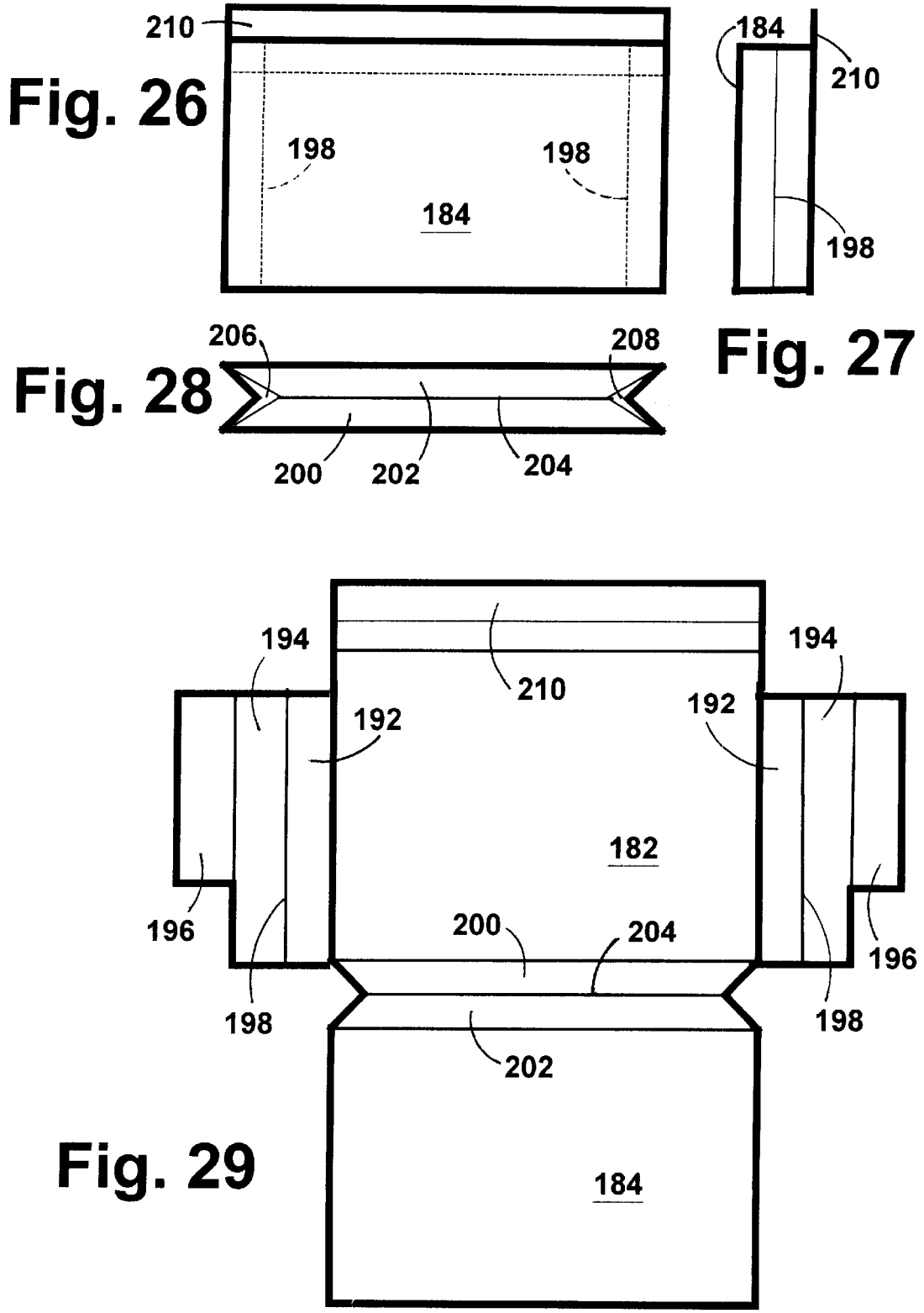

SYSTEMS, PROCESSES AND PRODUCTS FOR STORAGE AND RETRIEVAL OF PHYSICAL PAPER DOCUMENTS, ELECTRO-OPTICALLY GENERATED ELECTRONIC DOCUMENTS, AND COMPUTER GENERATED ELECTRONIC DOCUMENTS

CROSS-REFERENCES TO RELATED APPLICATIONS

The present application is a continuation-in-part of co-pending application Ser. No. 08/882,833, filed on Jun. 26, 1997, now U.S. Pat. No. 6,236,767, in the name of Gerald Altman for System and Method for Storing and Retrieving Matched Paper Documents and Electronic Images, which in turn is based upon the disclosure and filing date of provisional Application No. 60/020,902, filed on Jun. 27, 1996 in the name of Gerald Altman for Matched Electronic And Paper Documents In An Integrated Storage And Retrieval System.

BACKGROUND OF THE INVENTION

1. Field of the Invention

The present invention relates to systems, processes and products for the storage and retrieval of documentary information, including: physical documents, e.g. paper or photographic documents; corresponding electro-optically generated electronic documents, e.g. digital images produced by scanning or photography; and computer generated electronic documents, e.g. digital text, tables, spreadsheets, etc. produced by word processing, optical character recognition, intelligent document recognition, and/or digital graphics produced by computer aided design.

2. Description of the Related Art

Numerous systems and processes have been proposed for the storage and retrieval of documentary information. Traditional practices over the centuries, of course, have involved storage and retrieval by manually accessing indexed arrangements of original papers and other "hard copies" in folders, boxes, shelving and cabinets. Later practices have involved photographically reducing the original papers to produce indexed miniaturizations in microfilm spools or microfiche sheets, storing the spools or sheets in indexed containers, folders or other physical repositories, and retrieving images or hard copies of the miniaturizations by optical projection or photographic reproduction.

Now there is a proliferation of proposals for digital computer systems that opto-electronically scan original papers or other physical documents to create electronic representations in computer memory, to store digital records of these representations in magnetic and/or optical media, and to retrieve images or hard copies corresponding to these records electro-magnetically or electro-optically. It is common experience that effective paper filing systems have required unerring care by trustworthy persons who have some understanding of the business or other activity involved. Considerable reliance often has been placed on the memory of such persons, who have a tendency to become "indispensable" in mission critical situations. Moreover, even a generally effective system often is not conducive to physical and logical arrangements capable of implementing prompt storage and retrieval without constant inquiries to and guidance by professional level personnel. Finally, of course, a paper file is available to only one person at a time unless hard copies are made, in which case undesired paper proliferation occurs.

Although a few, but not all, of these problems are alleviated by the use of microfilm and microfiche, new and different problems arise. It is true that a large number of photographic miniaturizations can be stored in a much smaller space than an equivalent number of original papers. However, problems of storing and retrieving containers and folders of microfilm and microfiche are not unlike problems of storing and retrieving batches of their paper counterparts. More important, producing, imaging and retrieving photographic miniaturizations often are costly procedures requiring unwieldy hardware. As a practical matter, microfilm and microfiche may be limited to archival-type documentation that may not be compatible with a dynamic work environment.

Modern advances in low cost computer architecture, particularly, faster clock speeds, higher resolution displays, and denser storage media, have generated discussions of whether or not a "paperless office" is possible, and, indeed, what is the meaning of "paperless office". The difficulties mentioned above in connection with the storage and retrieval of paper documents, in a work environment, make it clear that minimization of the use of paper must be a preeminent practical objective. A critical advantage of electronic files over paper, microfilm, and microfiche files is that electronic files can be readily stored, sorted, retrieved and reorganized.

It is apparent that electronic files are capable of obviating tedious manipulation of original paper files when there may be no further need ever to refer to them. Nevertheless, despite the rapid growth of electronic filing, paper documents continue to proliferate. In many cases, reference to papers or other original physical documents, even if infrequent, may be essential. For example, original physical documents may be required or desired: (1) in litigation where particular rules of evidence may pertain; (2) as backup in the event that lost or faulty electronic images are discovered later; (3) in major commercial, financial and insurance dealings where physical signatures may be important or merely may be perceived to be important; (4) in internet transactions where the parties do not meet legal requirements for dispensing with paper signatures; (5) as backup for technical graphics, precision photographs, medical diagnostics, and the like, where differences in resolution between images and originals may become critical; (6) as backup in the event of corruption of electronic files; and (7) as complete copies of voluminous treatises in which only the table of contents and/or other selected portions may be imaged as a matter of convenience.

Another very possible reason for the continued proliferation of paper is a natural reluctance on the part of many to discard original paper files even after they have been imaged and stored in electronic media. For many, it simply may be difficult to overcome a habitual predilection to keep paper documents, and to accept the idea that electronic media, in many cases, is a secure and relatively versatile substitute. For many others, some types of paper documents, much of the time, simply are more comfortable to use, e.g. books, periodicals, etc.

Modern society demands knowledge work that is appropriate for the information age. The requirements are that: relatively low paying manual work, like filing paper documents, must be phased out; and relatively high paying knowledge work, like processing electronic documents, must be phased in. The fact is that total elimination of paper documents may be unachievable and/or undesirable. Rather, the present invention is based on clearly recognizing that there is an optimal interaction, in every commercial and technical situation, between minimizing the inherent inefficiency of storing and indexing paper documents, and maximizing the inherent efficiency of storing and indexing electronic documents.

Much confusion has been encountered in implementing systems that are based on: (1) imaged electronic documents of the type that are created by scanning or photographing paper documents and the like, (2) original paper documents themselves, and (3) computer generated electronic documents of the type that are created by word processing or graphics programs, e-mail or facsimile transmissions, and the like. The following are some of the conflicts involved: whether to store bit maps based on simple scanning, or text resulting from optical character recognition, or both; whether to mix optically generated electronic documents and computer generated electronic documents; to what extent the storage of optically generated electronic image files should mirror the storage of the original paper documents; whether or not an original paper filing system should be retained without change; whether or not a system is so sophisticated that computer literate professional level operators and/or supervisors are required; and whether or not a system is so rudimentary that even entry level operators may be sufficiently trustworthy.

The foregoing problems are greatly magnified (1) in systems dealing with law, medicine, finance, insurance, engineering and other disciplines, where difficulties may be encountered in retaining specifically knowledgeable personnel, and (2) in networked systems, where difficulties may be encountered particularly in standardizing procedures for the physical storage and retrieval of original physical paper documents, and, possibly, hard paper copies of electro-optically generated and computer generated documents, at disparate locations.

There is a requirement for systems in which the physical filing of paper documents is radically simplified, in which access to the locations of infrequently needed paper documents is precisely indicated, and in which optically generated electronic documents and computer generated electronic documents are clearly differentiated.

DEFINITIONS

In order to maintain clarity, the present document adopts the following definitions:

(I) physical documents (sometimes abbreviated to physical files) are defined herein as actual paper documents or actual photographs or the like, of the type that are manually tangible and visually perceptible;

(II) electronic image documents (sometimes abbreviated to image documents or image files) are defined herein as electronic files of the type that are generated electro-optically by scanning or photographing physical documents such as actual paper documents, photographs, and the like. In one form, these electronic image documents are bitmap documents;

(III) electronic work documents (sometimes abbreviated to work documents or work files) are defined herein as electronic documents that are generated in a computer by a word processor program, a spreadsheet, a computer aided design program, e-mail, facsimile, or the like. These electronic work documents may be in such formats as "pdf" (portable digital format) such as that sold by Adobe Systems, Inc., or as XML (Extensible Markup Language) such as that being adopted by Microsoft Corporation and others.

(IV) electronic documents (sometimes referred to as electronic files) include electronic image documents and electronic work documents.

BRIEF SUMMARY OF THE INVENTION

The primary object of the present invention is to provide, for the storage and retrieval of physical documents, electro-optically generated electronic documents, and computer generated electronic documents: systems, processes and products, which facilitate the use of electronic documents rather than physical documents whenever feasible or acceptable, and which facilitate the use of physical documents rather than electronic documents whenever necessary or preferred. The result is less individual and organizational frustration, and more creative use of time.

Pursuant to the present invention, at any isolated location or at any one or more locations in an enterprise comprising a network or group of networks: (1) newly received or generated electronic documents are simply entered at random in a sequence of date/time instances by computer generation and/or by electro-optical processing of physical documents; (2) the records of the electronic documents reference the date/time instances that constitute unique identifiers; (3) each of the physical documents is added to the beginning or the end of a cumulative stack in which its location is indicated by its date/time instance; and (4) the electronic documents are processed and organized to provide the electronic equivalent of virtual files that include related physical and electronic documents.

A preferred embodiment of the present invention includes a physical system and an electronic system. The physical system is characterized by a primary physical repository and a plurality of secondary physical repositories therein or thereon, which hold selected sequences of physical documents corresponding to selected ranges of the date/time instances. The selected ranges of the sequences of physical documents are contained by selected ones of the secondary physical repositories. The selected ones of the secondary physical repositories are visually marked with physical indicia corresponding to the selected ranges of the date/time instances. The electronic system is characterized by electronic tables, each representing a grid containing rows of electronic records and columns of electronic fields, the electronic fields including a plurality of primary (or ONE or key) electronic fields, and a plurality of secondary (or MANY or non-key) electronic fields. One of the primary fields includes date/time entries that uniquely designate corresponding logical groups of physical documents and corresponding logical groups of electronic documents. These date/time entries designate the precise physical locations of the corresponding physical documents. The secondary fields include other entries that designate other corresponding logical groups of physical documents and electronic documents. Such other groups of physical documents, in effect, are virtual groups of physical documents.

The result is an interactive combination of electronic records, which specify the precise physical locations of selected physical documents in terms of their date/time instances. Thus, selected logical groups of physical documents are virtual collections that are intermingled throughout the secondary repositories in a manner that does not permit them to be immediately available for physical compilation. On the other hand, such virtual collections correspond to selected logical groups of electronic images that are immediately available for electronic compilation and presentation.

BRIEF DESCRIPTION OF THE DRAWINGS

For a fuller understanding of the nature and objects of the present invention, reference is made to the following specification, which is to be taken in connection with the accompanying drawings wherein:

FIG. 4 illustrates printouts of pressure sensitive labels for folders containing batches of physical documents and for boxes containing batches of such folders.

FIG. 5 illustrates a file folder having visual indicia specifying a date/time interval that bounds a sequence of physical documents of the type corresponding to the thumbnail images of FIG. 2.

FIG. 6 illustrates a box having visual indicia specifying a date/time interval that bounds a sequence of file folders of the type corresponding to the file folder of FIG. 5.

FIG. 7a is a listing of details of the Entity Code Table of FIG. 7.

FIG. 8a is a listing of details of the Document Entry Table of FIG. 8.

FIG. 9a is a listing of details of the File Table of FIG. 9.

FIG. 10a is a listing of details of the Task Table of FIG. 10.

FIG. 19 illustrates a system, process and storage showing the processing of multiple streams of documents from multiple locations pursuant to the present invention.

FIG. 19a shows a block diagram of the system, process and storage of FIG. 19.

FIG. 26 is a front plan view of the file pocket of FIG. 25;

FIG. 27 is an end view of the file pocket of FIG. 26;

FIG. 28 is a bottom plan view of the file pocket of FIG. 26;

FIG. 29 is a layout view of the blank from which the file pocket of FIG. 28 is constructed;

DETAILED DESCRIPTION OF THE PREFERRED EMBODIMENTS

The Physical and Electronic Systems of FIGS. 1 to 6

Figure 1:
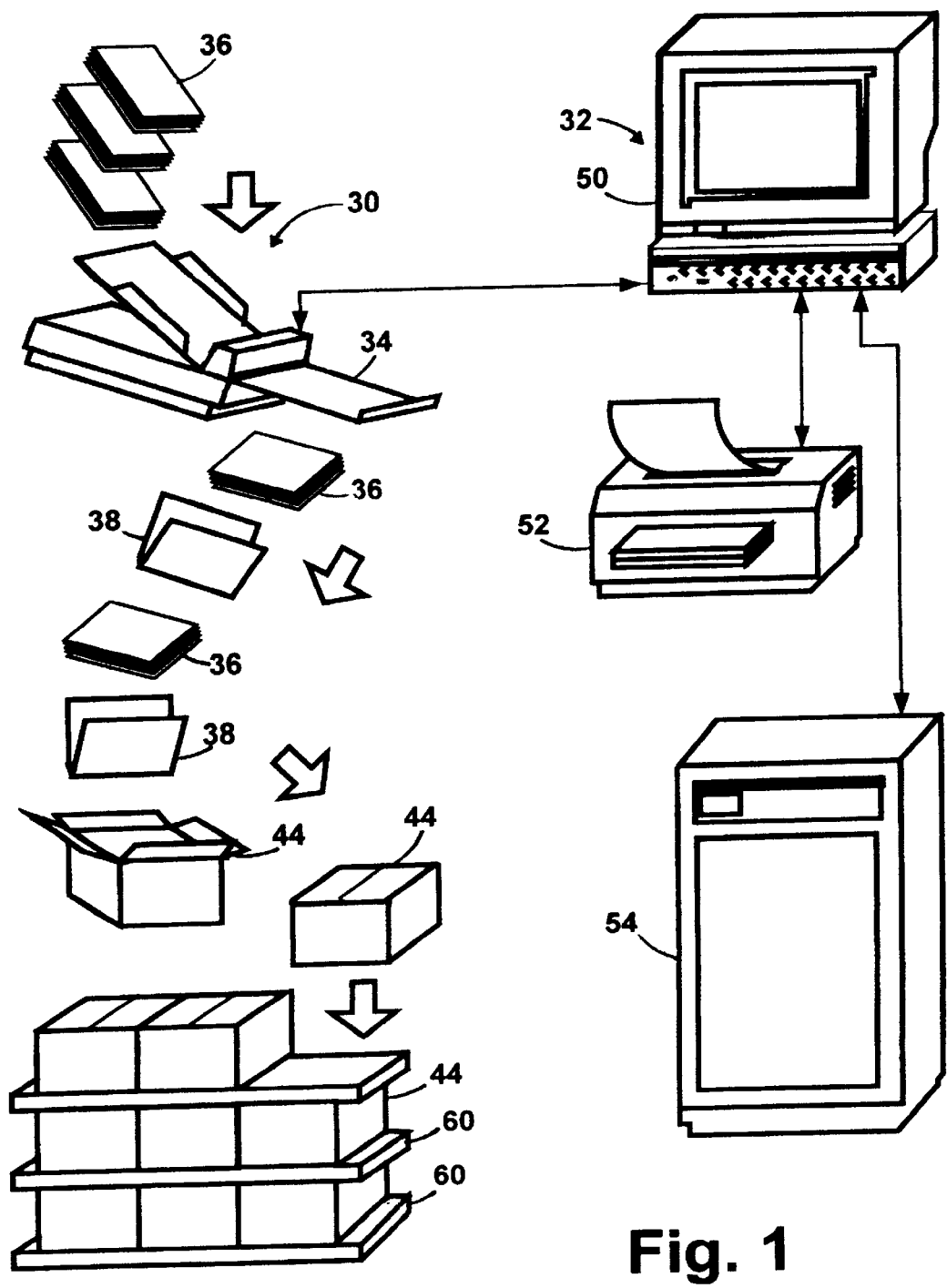
FIG. 1 illustrates a system, process and storage showing the processing of a single stream of documents pursuant to the present invention.
Figure 1A:
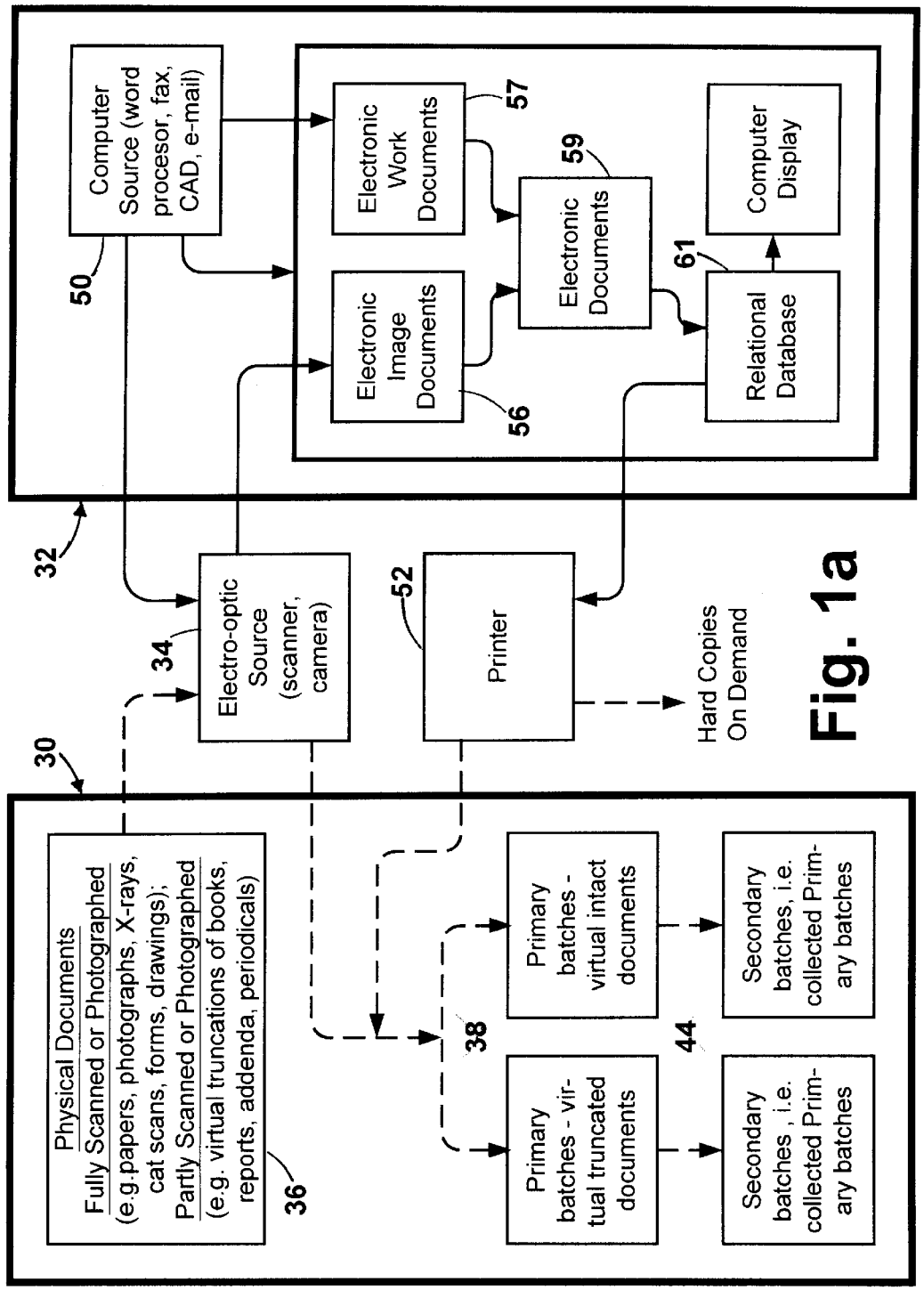
FIG. 1a shows a block diagram of the system, process and storage of FIG. 1.

As shown in FIGS. 1 and 1a, the illustrated embodiment of the present invention comprises a master system that includes a physical system 30 and an electronic system 32. These systems share an electro-optical scanner or camera 34. Scanner or camera 34 processes random sequences of physical paper documents 36 to produce sequences of electronic image documents 56 in sequences of date/time instances.

Sequences of paper or plastic depositories in the form of file folders (or file pockets) 38 in turn store the sequences of paper documents 36. As is shown in FIG. 5, each of folders 38 is marked with indicia 40, 42, which indicate the beginning and ending of the range of date/time instances of the paper documents there within. Sequences of depositories in the form of cardboard or plastic boxes 44 store the sequences of folders 38. As is shown in FIG. 6, each of boxes 44 is marked with indicia 46, 48, which indicate the beginning and ending of the range of date/time instances of the folders there within.

Electronic system 32 includes a computer workstation 50 that is operatively connected to scanner 34 for transmission to the scanner of control signals, and receipt from the scanner of data signals representing image documents and their unique date/time instance identifiers. Workstation 50 controls the production by scanner 34 of electronic image documents 56, e.g. vector and bitmap images, and generates electronic work documents 57, e.g. from text and graphics programs, or from e-mail or facsimile transmissions. Electronic image documents 56 and electronic work documents 57 are grouped as electronic documents 59.

Figure 2:
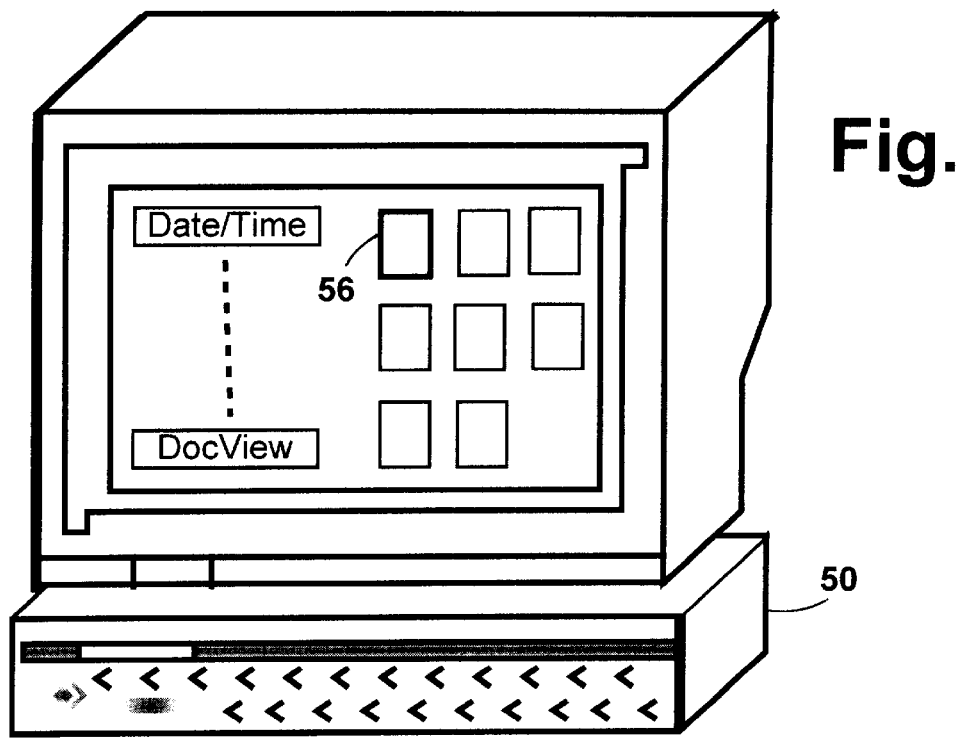
FIG. 2 illustrates a graphical user interface having date/time indexing features and an imaging window that displays thumbnail views of documents, the entries of which fall within a specific date/time interval.
Figure 3:
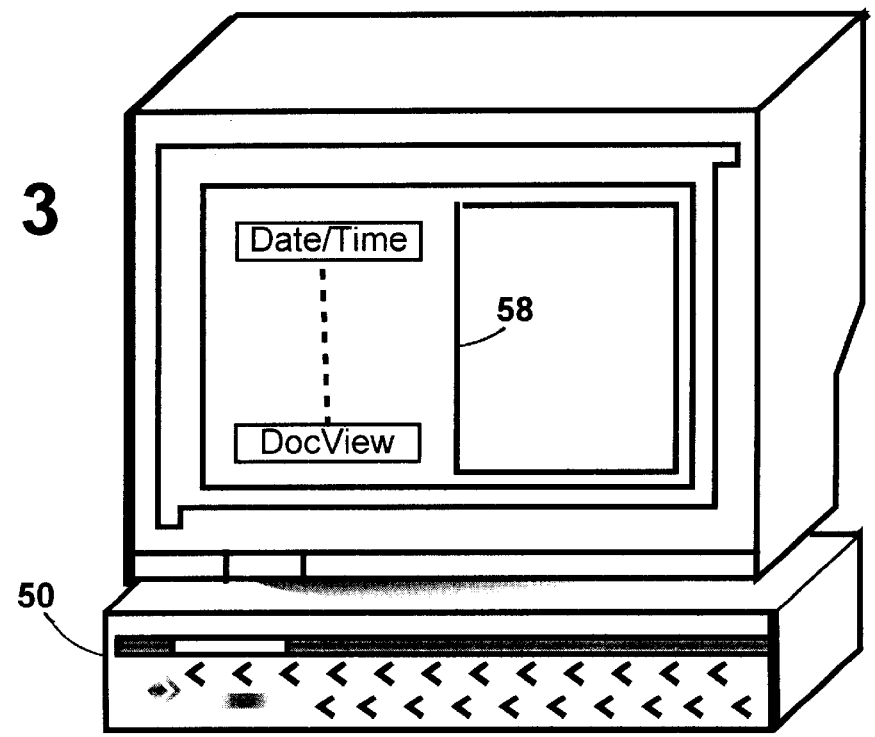
FIG. 3 illustrates a graphical user interface having date/time indexing features and an imaging window that displays a blow-up view corresponding to one of the thumbnail views of FIG. 2, the entries of which fall within a specific date/time interval.

Workstation 50 controls a printer 52 for producing labels as in FIG. 4, and transmits digital information, including the date/time instances of their creation, for recording in a database in an electronic storage 54. Electronic storage 54 typically takes the form of magnetic, optical, or magneto-optical media, e.g. disks or tape. As shown in FIGS. 2 and 3, workstation 50 can present the image documents generated by scanner 34 as thumbnail views 56 or blow-up views 58.

As shown in FIG. 1, physical system 30 includes a plurality of shelves 60. Stored on these shelves are boxes 44 (and/or other bundles), which contain folders 38 (and/or other physical repositories). As stated previously in connection with FIGS. 4, 5, and 6, each of the boxes 44 in FIG. 1 is marked with indicia 46, 48, which indicate the beginning and ending of the range of date/time instances of the folders there within.

Preferably, indicia 40, 42, 46, and 48 are presented in both date/time alphanumeric characters and date/time bar code. In an alternative embodiment, these indicia are presented in other alphanumeric characters and/or other bar codes that indirectly refer to date/time instances. The arrangement is such that any of the boxes themselves, or any of the folders they contain are available for convenient visual or optical retrieval. Furthermore, any of the papers there within are available for convenient visual and manual retrieval because of the relatively isolated short stacks in which they are confined.

The Relational Database of FIGS. 7 to 11

Figure 7:
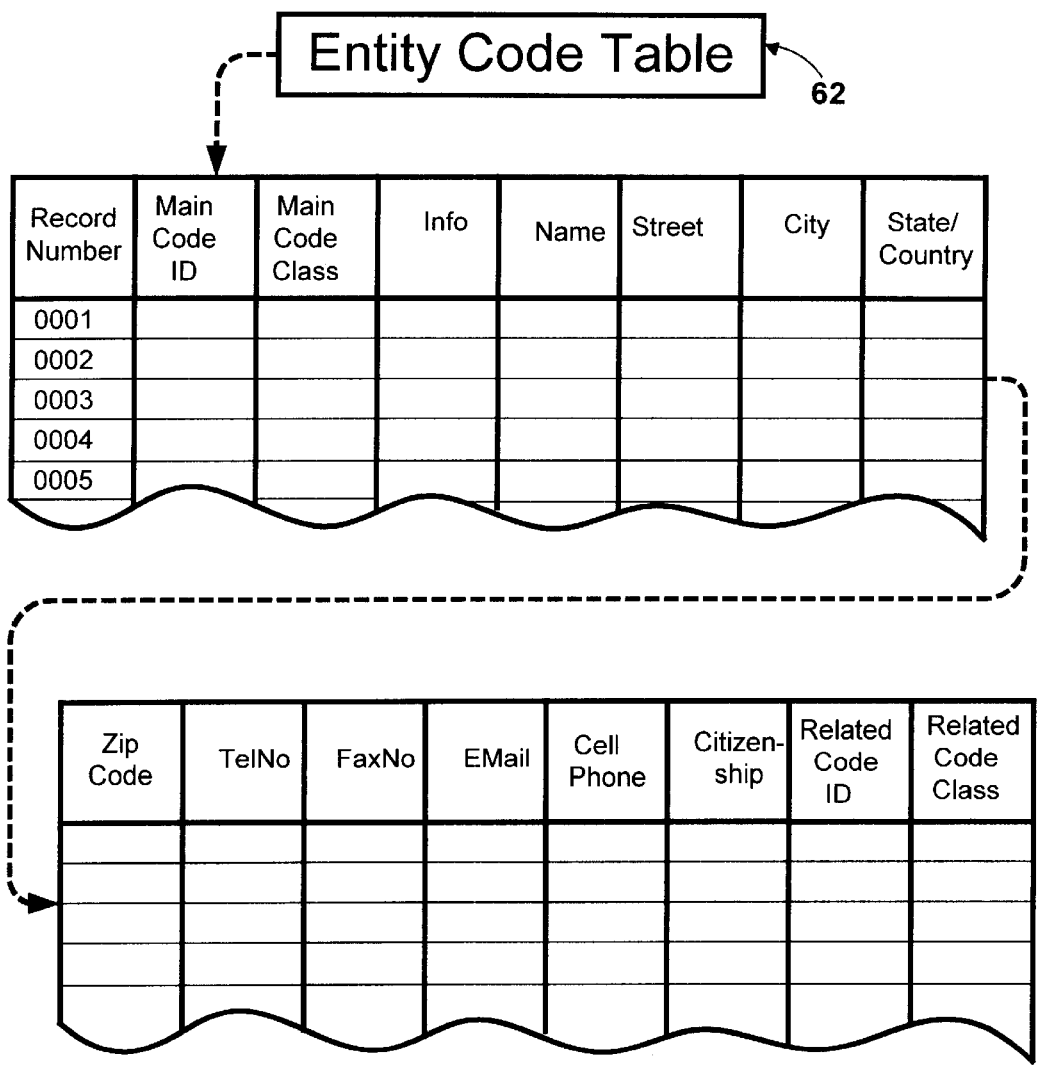
FIG. 7 illustrates an Entity Code Table of a relational database pursuant to the present invention.
Figure 8:
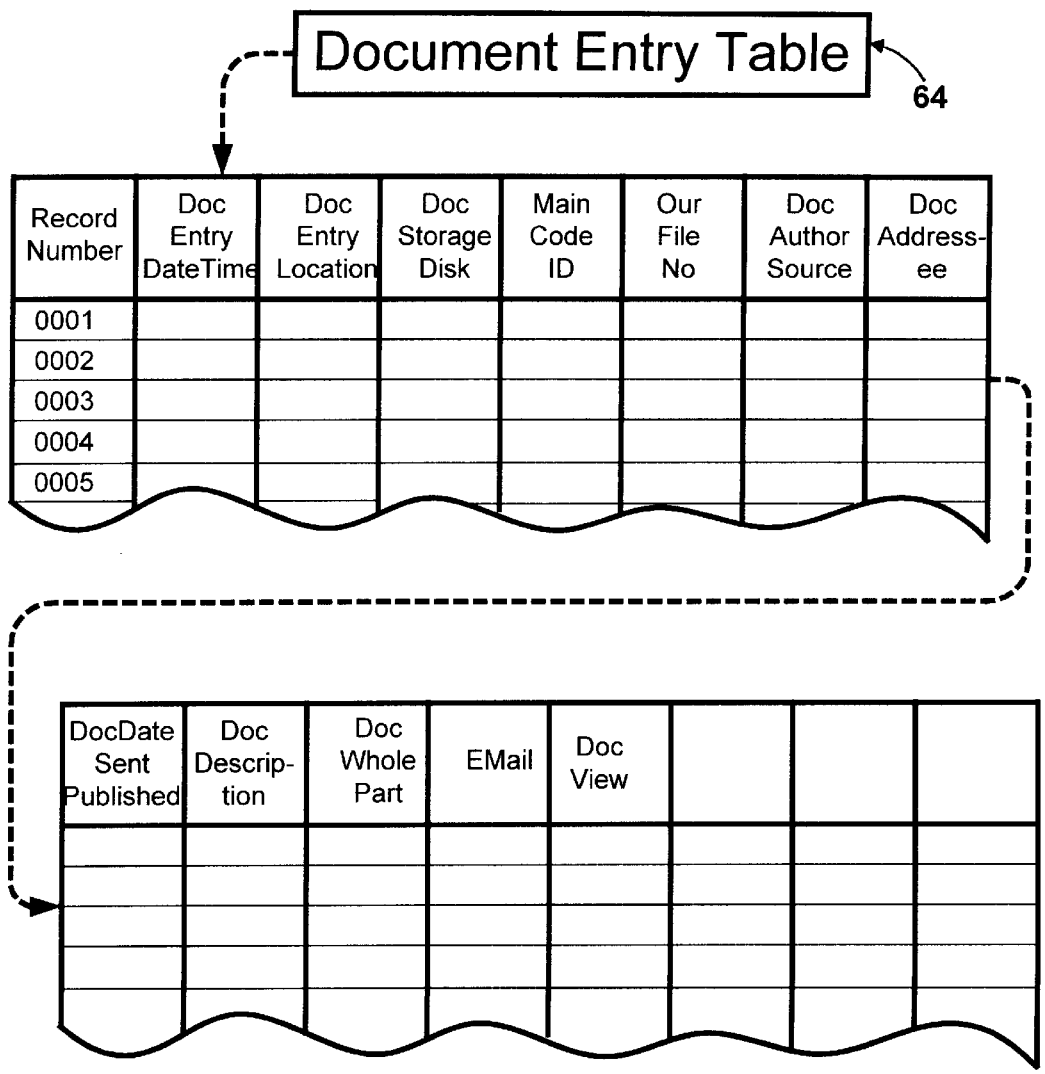
FIG. 8 illustrates a Document Entry Table of the relational database of FIG. 7 pursuant to the present invention.
Figure 9:
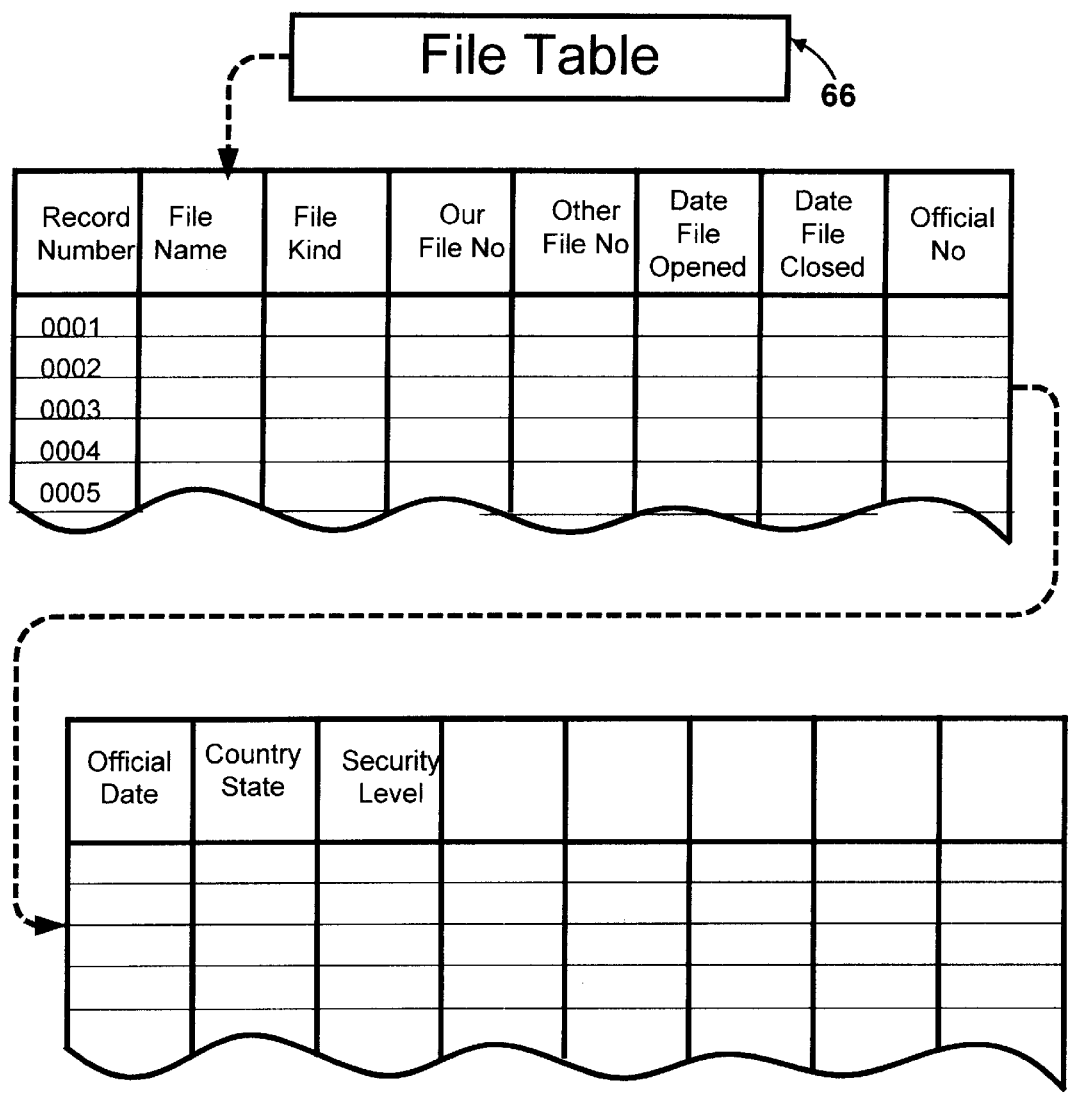
FIG. 9 illustrates a File Table of the relational database of FIGS. 7 and 8 pursuant to the present invention.
Figure 10:
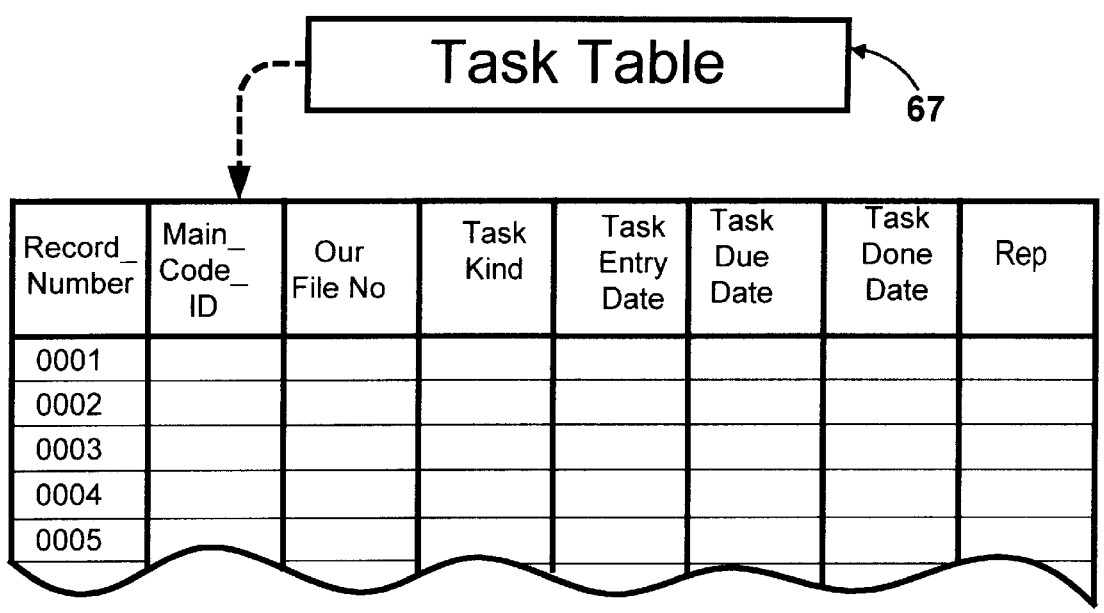
FIG. 10 illustrates a Task Table of the relational database of FIGS. 7, 8, and 9 pursuant to the present invention.

Electronic system 32 provides and controls a relational database 61, which includes: an Entity Code Table 62 as shown in FIGS. 7 and 7a; a Document Entry Table 64 as shown in FIGS. 8 and 8a; a File Table 66 as shown in FIGS. 9 and 9a; and a Task Table 68 as shown in FIGS. 10 and 10a.

The Entity Code Table, which is shown at 62 in FIG. 7 and described in 7a, includes a Main_Code_ID field, which identifies each entity in the database by a unique code, and a Main_Code_Class field, which characterizes each such entity as an organization or individual. A preferred code, which is not novel per se, comprises as values either of the following. (1) In the case of an organization, the code consists of the first five alphanumeric characters of a company name plus a successive integer beginning with 001. (2) In the case of an individual, the code consists of the first five alphanumeric characters of the individual's surname plus a successive integer beginning with 001. The successive integer serves to distinguish codes of companies and individuals that are otherwise the same. The Entity Code Table also includes a Related_Code_ID field, which may identify a secondary selection from the Main_Code_ID, and a Related_Code_Class field, which may indicate one of a class of relationships, i.e. contact, officer, adversary, etc., between the Main_Code_ID field and the Related_Code_ID field.

The Document Entry Table, which is shown at 64 in FIG. 8 and described in FIG. 8a, includes a Doc_Entry_Date_Time field, which contains Date_Time values that uniquely identify the electro-optical or computer-generated presentations, i.e. values, in the Doc_View field. Preferably, a unique value in the Doc_Entry_Date_Time field is generated automatically by the system during scanning or computer generation, preferably in terms of year, month, day, hour, minute and second (yy, mm, dd, hh, nn, ss). As a practical matter, a duplicate automatically generated value in the date/time field is precluded in many server systems since any slight automatic delay will cause the generation of a second nonduplicate value. Thus each electro-optically generated document or computer-generated document is uniquely identified at the moment of its creation by a date/time entry. The data type of the Doc_View field is any electronic document, i.e. data object, that is supported by the electronic system, whether image, text, vector or bit map.

The File Table, which is shown at 66 in FIG. 9 and described in FIG. 9a, includes a File_Name field, each value of which is a unique identifier of a particular class or category, and an Official_No field, which, for example, may refer to a government agency serial number or registration number, a court docket number, a medical plan or group number, an insurance policy number, a retail or wholesale customer number, a law practice client number, a medical practice patient number, or the like. Pursuant to the present invention, physical documents of different entities, which may be classified in any such File_Name or Official_No field, are randomly dispersed throughout the primary and secondary repositories of physical system 30.

The Task Table, which is shown at 67 in FIG. 10 and described in FIG. 10a, includes: a Main_Code_ID field, which typically refers to a value that is indexed in the Main_Code_ID field of Entity Code Table 62; an Our-File_No field, which typically refers to a value that is indexed in the File_Name field of File Table 66; and a Designated_Rep field, which typically indicates the person responsible for performing any required task as referenced in a value that is indexed in the Main_Code_ID field of Entity Code Table 62.

Figure 11:
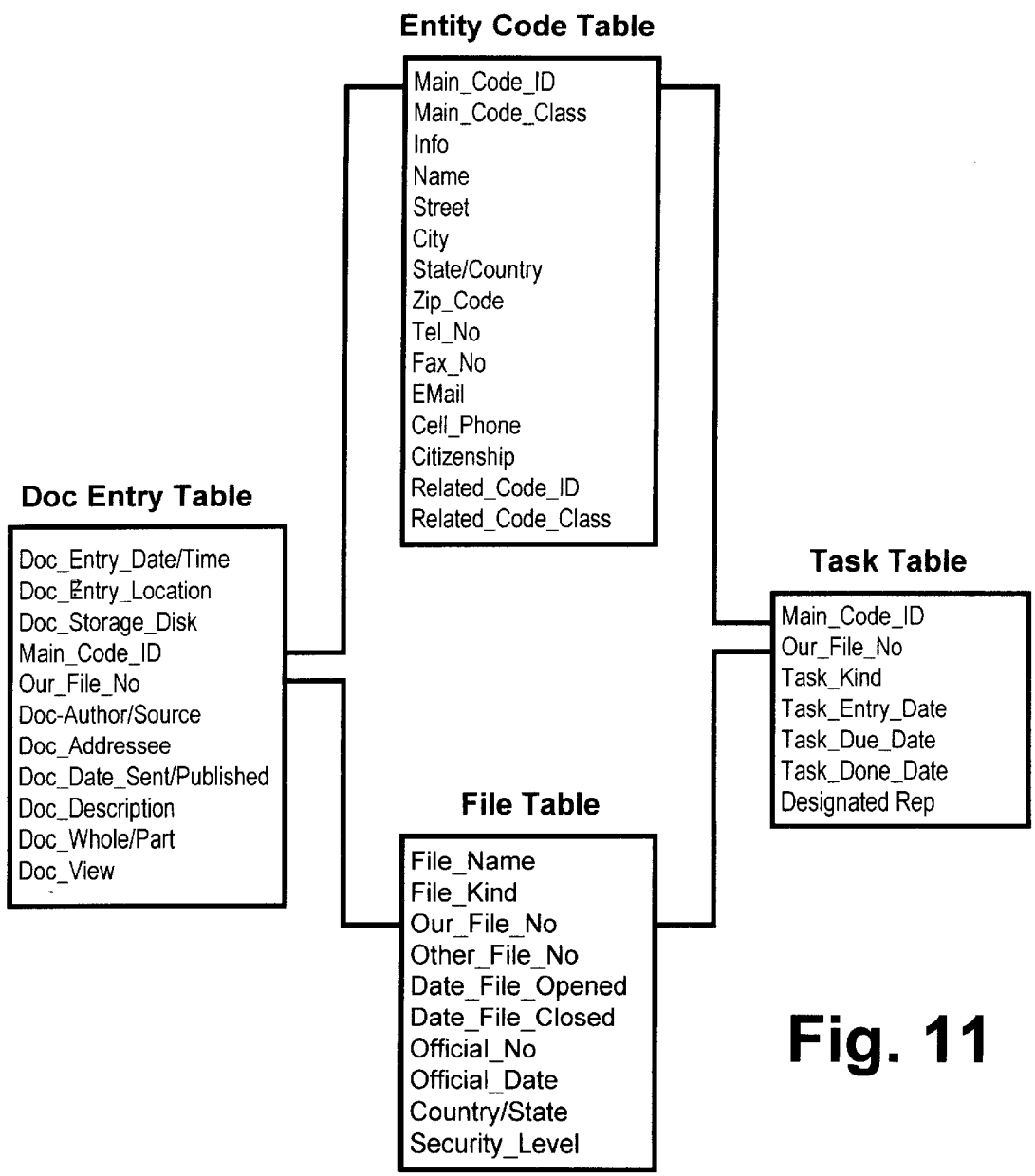
FIG. 11 is a diagram showing relationships among the aforementioned tables of FIGS. 7 through 10.

As shown in FIG. 11, the following relational links exist among the tables of the illustrated relational database. The Main_Code_ID of the Entity-Code Table is linked to the Main_Code_ID fields of the Doc Entry Table and the Task Table. The Our_File_No field of the File Table is linked to the Our_File_No fields of the Doc Entry Table and the Task Table. The arrangement is such that the specific location of any physical document is available to any person classified in the Designated Rep field of the Task Table, no matter who is the person who entered the physical document in the system.

Figures 12, 13:
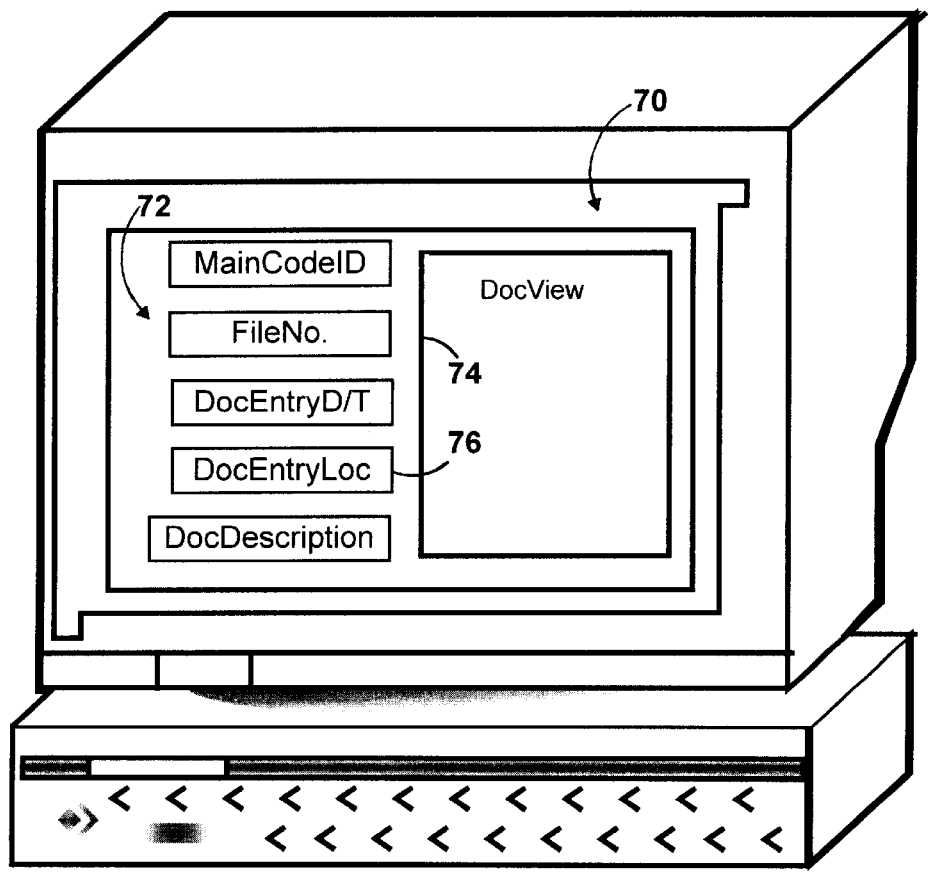
FIG. 12 is a query table that enables the retrieval of electronic images and identifies the locations of their physical counterparts, pursuant to MainCodeID and FileNo selections.
FIG. 13 illustrates a graphical user interface presenting a rendition of the results of a query pursuant to the query table of FIG. 12.

The Query of FIGS. 12 and 13

FIG. 12 shows a Query Table 68 and FIG. 13 shows a computer having a graphical user interface 70, which demonstrate the retrieval, from an electronic form 72, of an electronic document 74 and the precise physical location 76 of the corresponding physical document.

Figure 14:
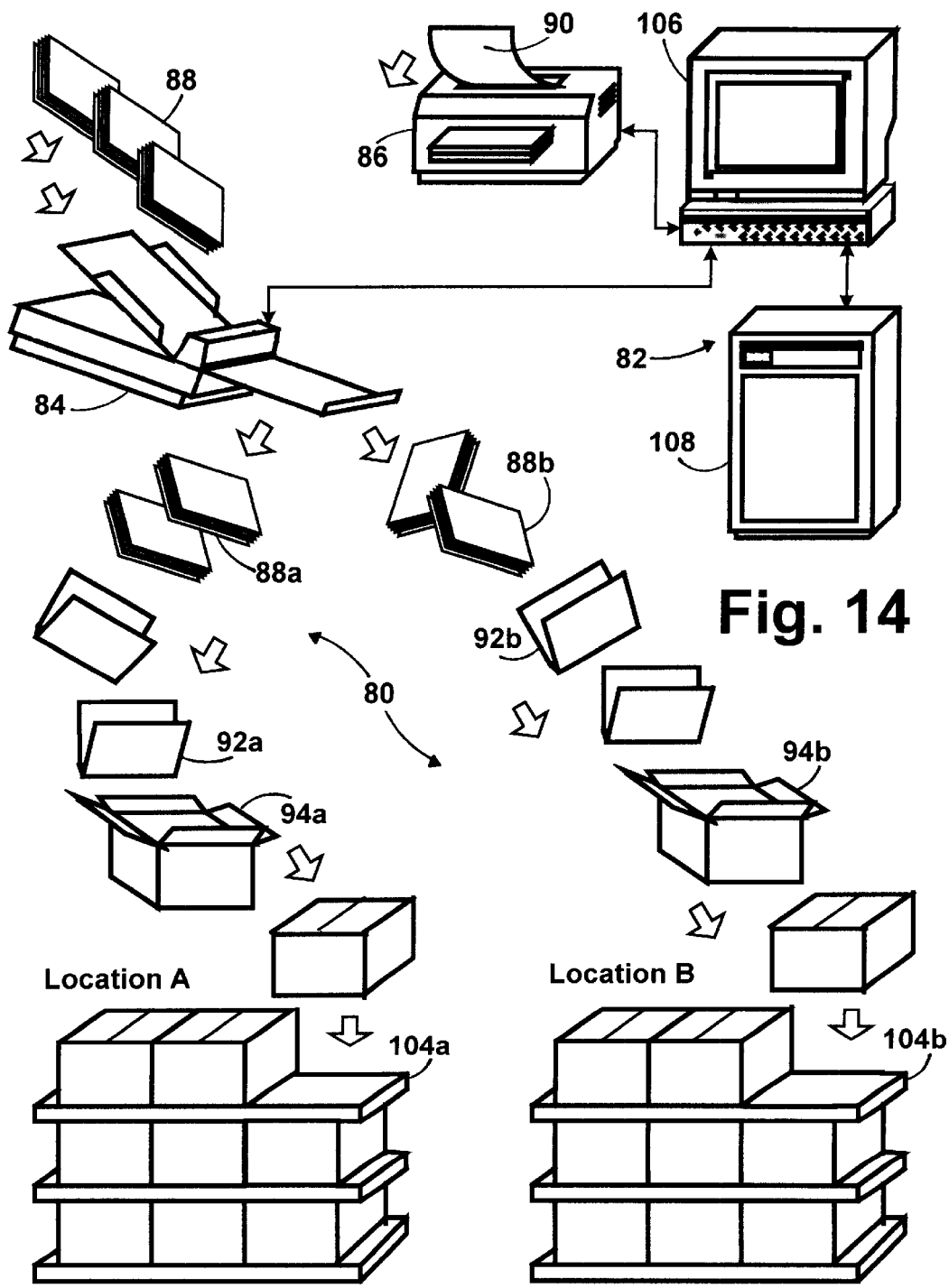
FIG. 14 illustrates a system, process and storage showing the processing of multiple streams of documents pursuant to the present invention.
Figure 14A:
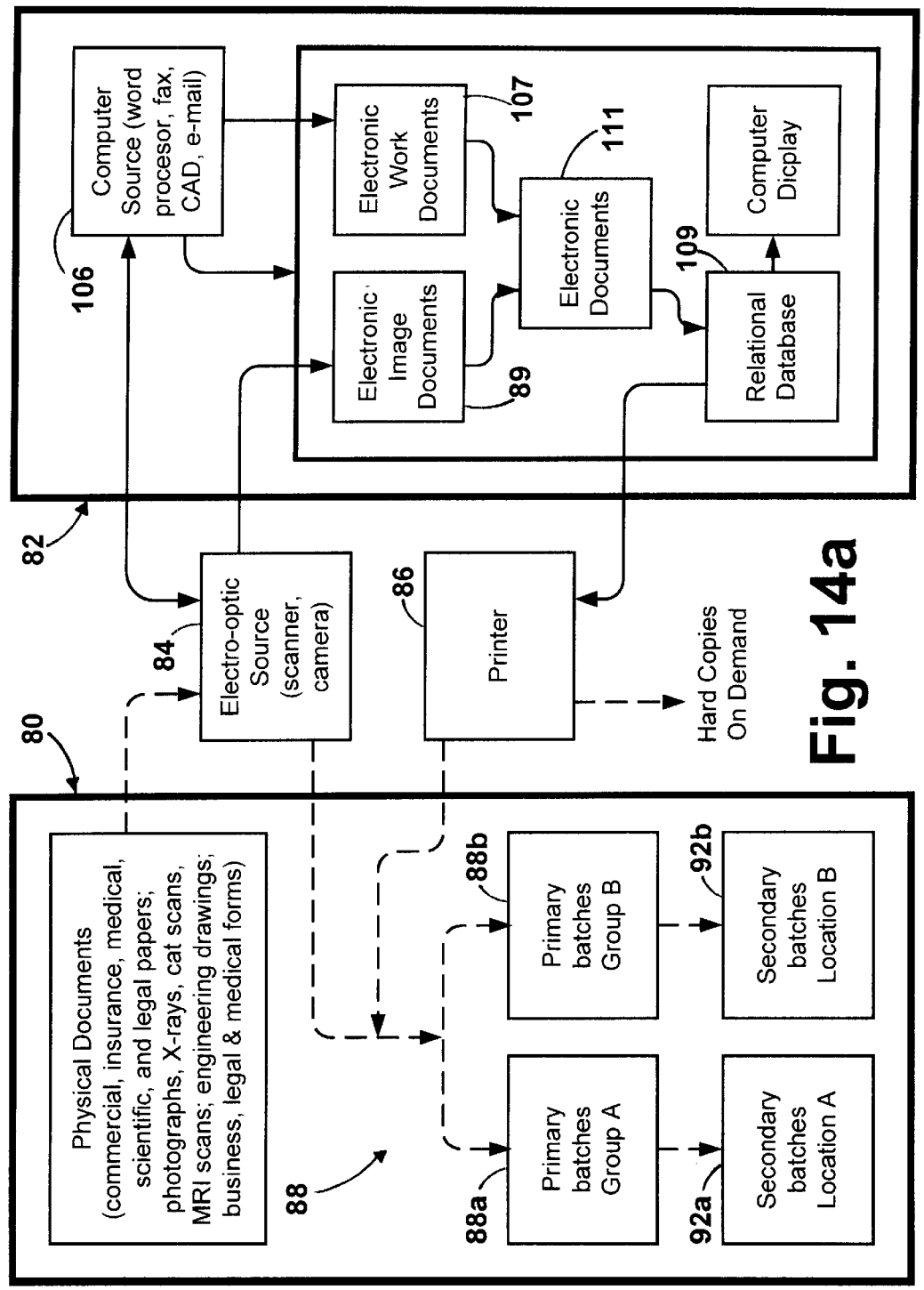
FIG. 14a shows a block diagram of the system, process and storage of FIG. 14.
Figure 15:
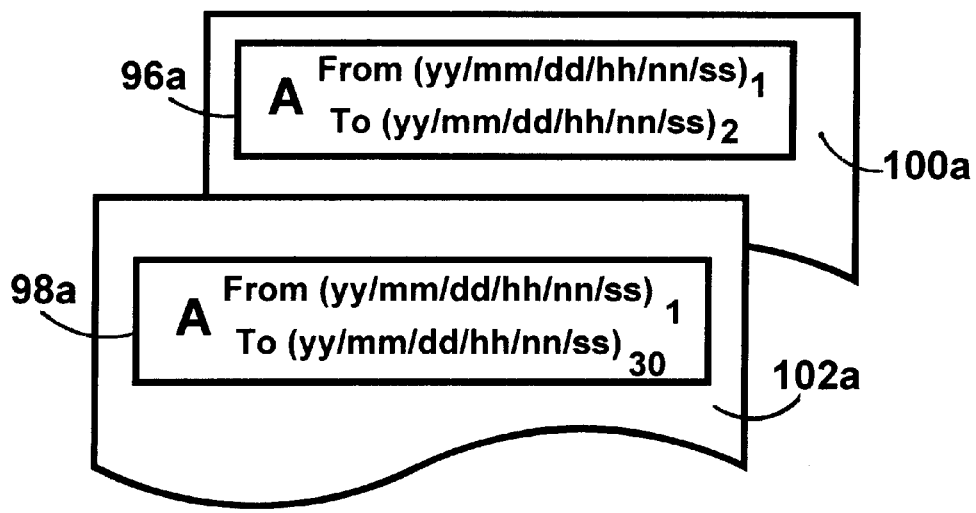
FIG. 15 illustrates printouts, for one of the streams of FIG. 14, of pressure sensitive labels for folders containing batches of physical documents and for boxes containing batches of such folders.
Figure 16:
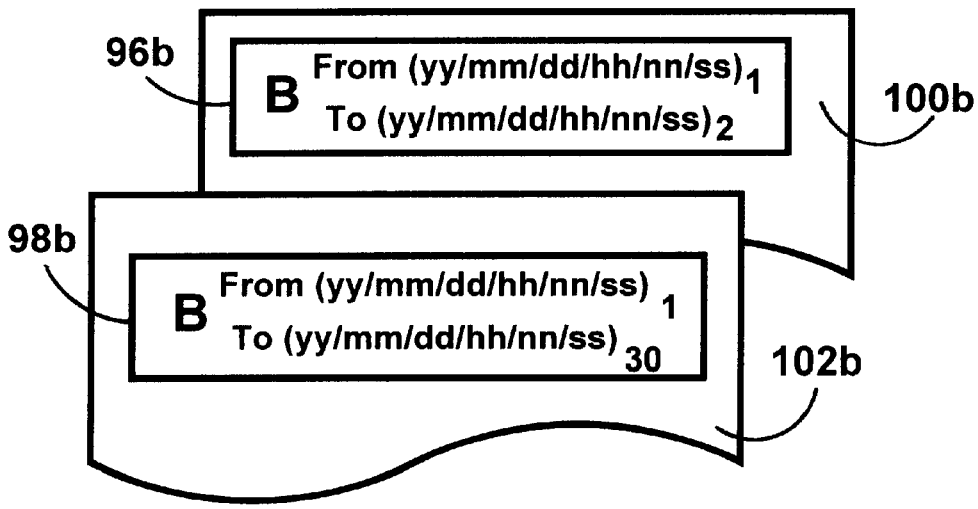
FIG. 16 illustrates printouts, for another of the streams of FIG. 14, of pressure sensitive labels for folders containing batches of physical documents and for boxes containing batches of such folders.

The Physical and Electronic Systems of FIGS. 14 TO 16

FIG. 14 shows a master system that includes a physical system 80 and an electronic system 82. These systems are associated with a relational database configuration of the type shown in FIGS. 7 to 11. The physical and electronic systems share a scanner 84 and a printer 86.

Scanner 84 processes random sequences of paper documents 88a and 88b to produce sequences of electronic image documents in sequences of date/time instances. Printer 86 produces physical visual indicia that show the start and finish of any such sequence of date/time instances. As will be explained in greater detail below, physical system 80 processes two physical document streams 88a and 88b. Sequences of physical documents of the first physical document stream 88a are archived permanently. Sequences of physical documents of the second physical document stream 88b are archived for a limited term or terms.

In first physical document stream 88a, sequences of physical folders 92a store sequences of paper documents 88a from the scanner, and sequences of boxes 94a in turn store the sequences of folders 92a. In second document stream 88b, sequences of physical folders 92b store sequences of paper documents 88b from the scanner, and sequences of boxes 94b in turn store the sequences of physical folders 92b. The destination of folders 92a and boxes 94a is physical Location A at 104a. The destination of folders 92b and boxes 94b is Location B at 104b. The physical folders and boxes typically are constructed from inexpensive materials, composed, for example, of cardboard, plastic or the like.

As is shown in FIG. 15, the physical visual indicia for the folders and boxes of the first physical stream are respectively in the form of pressure sensitive labels 96a and 98a, which respectively are mounted on the release plastic coated faces of carrier sheets 100a and 102a, respectively. When labels 96a and 98a are peeled from carrier sheets 100a and 102a and applied to folders 92a and boxes 94a, respectively, the printed indicia indicate the start and finish of the range of date/time instances of the paper documents there within, and additionally the physical destination, location A, of the relevant document stream. Similarly, when labels 96b and 98b are peeled from carrier sheets 100b and 102b and applied to folders 92b and boxes 94b, respectively, the printed indicia indicate the start and finish of the range of date/time instances of the paper documents there within, and additionally the physical destination, location B, of the relevant document stream As shown in FIG. 14, distinguishably marked boxes 94a and 94b, are stored on shelves 104a and 104b in physical locations A and B, respectively. Location A receives those physical documents that are to be archived permanently, and location B receives those documents that are to be archived for a limited term that ends on a date certain.

Electronic system 82 includes a workstation 106 and an electronic storage 108 that contains a relational database 109. Workstation 106 is operatively connected to scanner 84 for transmission to the scanner of control signals that synchronize the generation of date/time instances, and that receive from the scanner data signals representing electronic image documents and their date/time identifiers.

As indicated earlier, workstation 106 also generates electronic work documents 107 other than electronic image documents, i.e. those produced by word processing or computer aided design, or those received by transmission from local area or wide area networks, facsimile, or the Internet. All such electronic work documents, like all of the aforementioned electronic image documents, are uniquely identified by date/time instances that are assigned at the time of their production by computer generation, transmission or reception. These electronic image documents and electronic work documents are collectively shown as electronic documents 111.

Workstation 106 is operatively connected to electronic storage 108 for transmission to and retrieval from storage 108 of control and data signals that represent electronic image documents and electronic work documents, and their date/time identifiers. These electronic documents are image documents and work documents in any of various bitmap, vector, text or other formats, such as the PDF (Portable Document Format) format promulgated by Adobe Systems, Inc., or the XML (Extensible Markup Language) format promulgated by Microsoft Corporation among others.

In the manner shown in FIGS. 2 and 3, workstation 106 can present the electronic image documents and the electronic work documents as thumbnail views or blow-up views. Workstation 106 is operatively connected to printer 86 for transmission to and receipt from the printer of control signals for the production of physical documents. These physical documents include labels 96a, 98a, 96b, and 98b, as well as read-outs of logical sets of records that are retrieved from electronic storage 108.

Figures 17, 18:
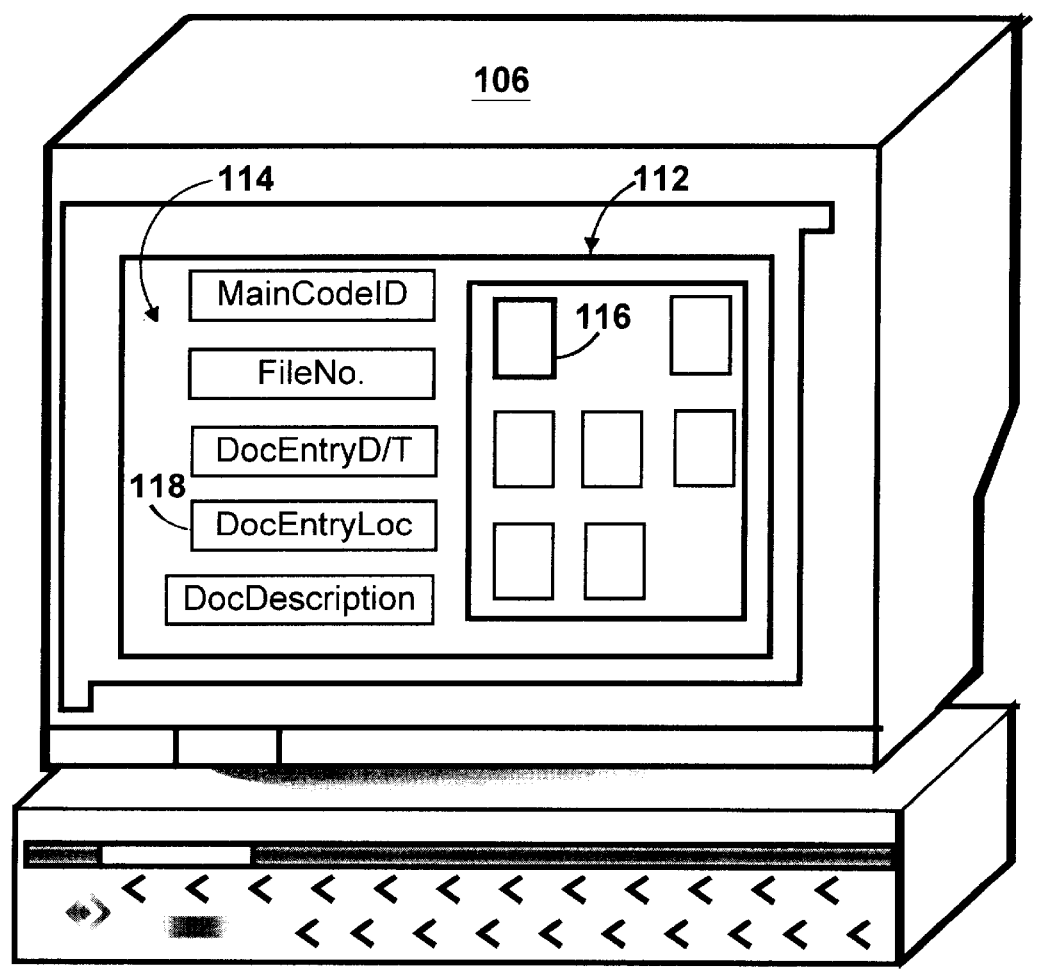
FIG. 17 is a query table that enables the retrieval of electronic images and identifies the locations of their physical counterparts, pursuant to MainCodeID, FileNo, and DocEntryLocation selections.
FIG. 18 illustrates a graphical user interface presenting a rendition of the results of a query pursuant to the query table of FIG. 17.
Figure 20:
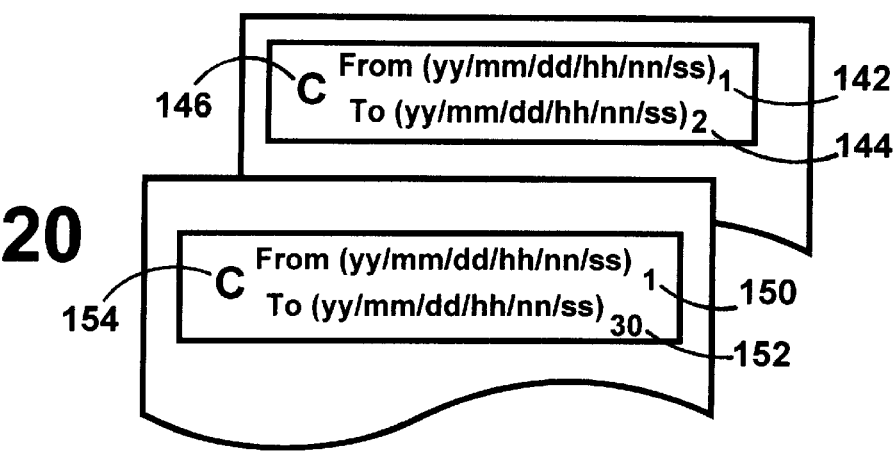
FIG. 20 illustrates printouts, for one of the streams of FIGS. 19 and 19a, of pressure sensitive labels for folders containing batches of physical documents and for boxes containing batches of such folders.

The Query of FIGS. 17 and 18

FIG. 17 shows a Query Table 110 and FIG. 18 shows a computer having a graphical user interface 112, which demonstrate the retrieval, from an electronic form 114, of an electronic document 116 and the precise physical location 118 of a corresponding physical document.

The Physical and Electronic Systems of FIGS. 19 TO 22

FIG. 19 illustrates an enterprise system that comprises: a plurality of local area networks 120, 122, 124, and a master network 126. Local area networks 120, 122, and 124 are physical accounts that are at different physical locations C, D, and E. Master network 126 is at a central physical location Y. Each of the local networks includes a local physical system 128 and a local electronic system 130. The master network includes a master physical system 132 and a master electronic system 134. These systems are associated with and have access to a relational database configuration of the type shown in FIGS. 7 to 11. Preferably, this relational database configuration resides in master electronic system 134.

Physical system 128 and electronic system 130 share a scanner 136 for processing random sequences of paper documents 138 to produce sequences of electronic image documents in sequences of date/time instances. Sequences of paper or plastic folders 140 in turn store the sequences of paper documents. Each of folders 140 is marked with indicia 142, 144, which indicate the beginning and ending of the range of date/time instances of the paper documents there within, and additionally the physical location 146 of the relevant physical account. Sequences of cardboard or plastic boxes 148 store the sequences of folders 140. Each of boxes 148 is marked with indicia 150, 152, which indicate the beginning and ending of the range of date/time instances of the folders there within, and additionally the physical location 154 of the relevant physical account. Full boxes 148 are transported to a central physical location 156, which is designated as Location Y in FIG. 19.

Electronic system 130 includes a file server 158 that is operatively connected to scanner 136 for transmission to the scanner of control signals, and receipt from the scanner of data signals representing image documents and their unique date/time instance identifiers. A plurality of workstations 160 are operatively connected to server 158 via a hub 162. Workstations 160 can call up electronic documents, including electronic image documents, from server 158, and can generate electronic work documents, including text, vector and bitmap documents for transmission to server 158 and recording in terms of the date/time instances of their creation. Server 158 in turn is operatively connected to a bridge 164 for further processing of its electronic image and computer generated documents. In the manner shown in FIGS. 2 and 3, workstations 160 can present, as thumbnail views or blow-up views, the electronic image documents generated by scanner 136 and the electronic work documents generated by workstations 160.

Physical system 132 of master network 126 includes one or more off-site depositories 132, each of which includes a plurality of shelves 166. Stored on the shelves are boxes 148 and/or other bundles, which contain folders 140 and/or other physical objects. In the manner described earlier, each of folders 140 is marked with indicia 142, 144, which indicate the beginning and ending of the range of date/time instances of the physical documents therewithin. As stated previously, each of boxes 148 is marked with indicia 150, 152, which indicate the beginning and ending of the range of date/time instances of the folders there within, and an indicium 154, which indicates the location of the account from which the box was physically shipped.

Preferably, indicia 142, 144, 146, 150, 152 and 154 are presented in both date/time alphanumeric characters and date/time bar code. In an alternative embodiment, these indicia are presented in other alphanumeric characters and/or other bar codes that indirectly refer to date/time instances. The arrangement is such that any of the boxes themselves, or any of the folders they contain are available for convenient retrieval.

Figure 21:
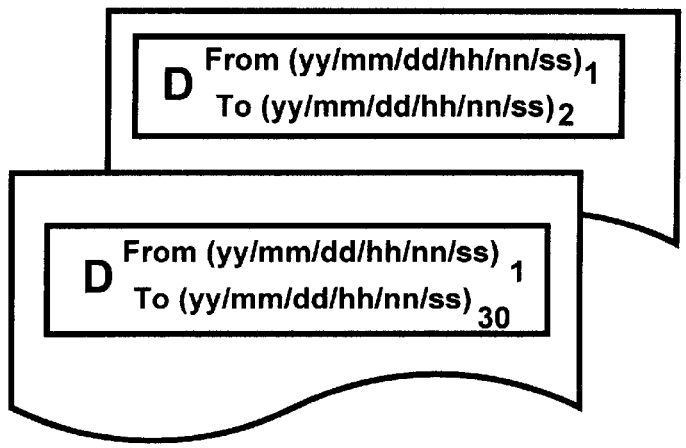
FIG. 21 illustrates printouts, for another of the streams of FIGS. 19 and 19a, of pressure sensitive labels for folders containing batches of physical documents and for boxes containing batches of such folders.
Figure 22:
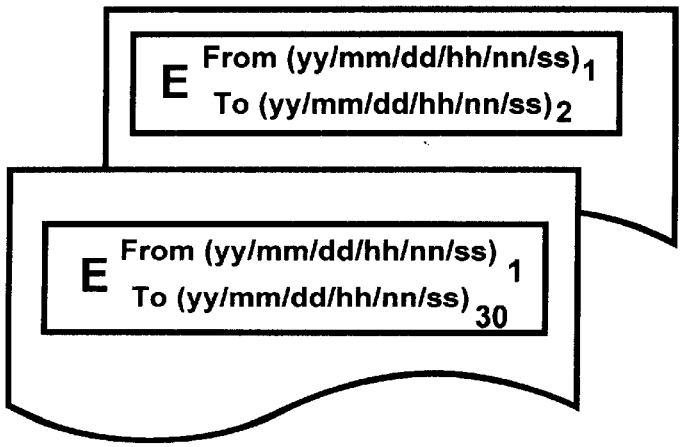
FIG. 22 illustrates printouts, for another of the streams of FIG. 20, of pressure sensitive labels for folders containing batches of physical documents and for boxes containing batches of such folders.

FIGS. 21 and 22 illustrate the labels that are applied respectively to the folders and boxes of physical accounts 122 and 124 to visually present their ranges of date/time instances. The boxes of physical accounts 120, 122, and 124 all stored in the order of their initial date/time instances. In effect, boxes from all of Locations A, B and C are intermingled with each other, but are sequenced in the order of their initial date/time instances.

Electronic system 134 includes a database server 168, which is operatively connected to a bridge 170. Bridge 170 in turn is operatively connected to the bridges 164 of local networks 120, 122, and 124, at C, D, and E, respectively. Server 168 also is operatively connected to a master electronic storage 172, which is the central electronic repository of all relevant image generated electronic documents and all relevant computer generated electronic documents in the illustrated enterprise system. Electronic system 134 provides and controls a relational database of the type shown in FIGS. 7 through 11.

Preferably, a value in the date/time field of the Document Entry Table is automatically generated by the system during scanning or computer generation, preferably in terms of year, month, day, hour, minute and second (yy, mm, dd, hh, nn, ss). Thus each electro-optically generated image document and each computer generated work document is uniquely identified at the moment of its creation by a date/time entry.

Figures 23, 24:
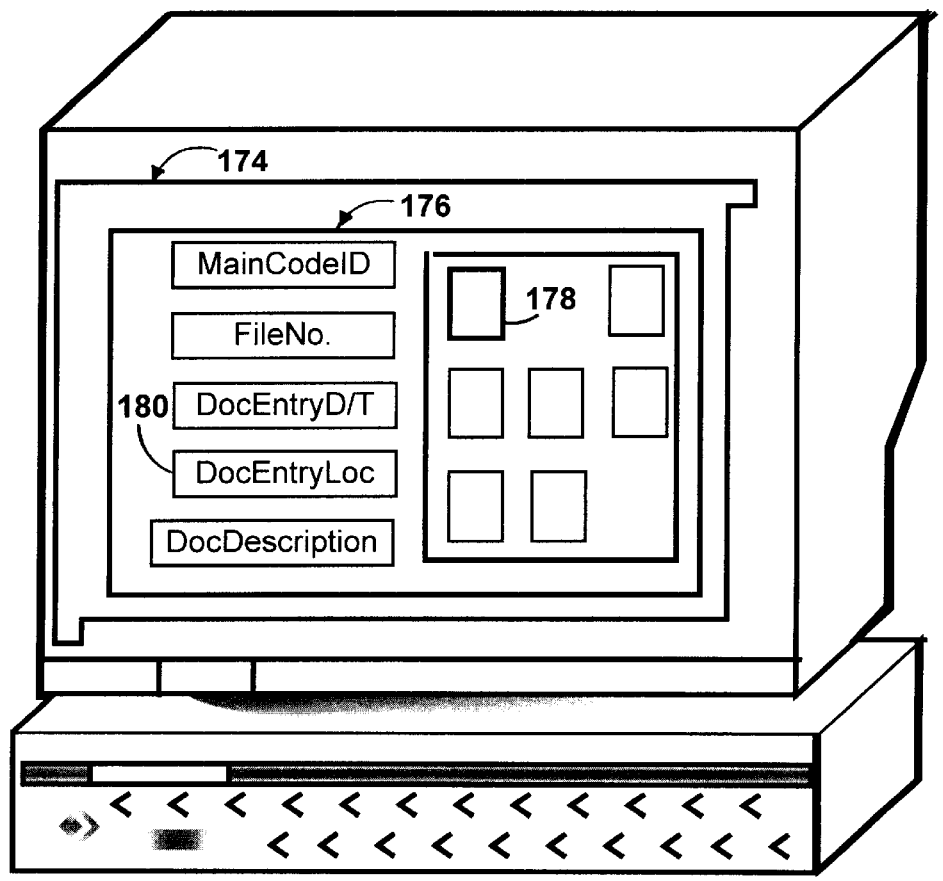
FIG. 23 is a query table that enables the retrieval of electronic images and identifies the locations of their physical counterparts, pursuant to MainCodeID, FileNo, and DocEntryLocation selections.
FIG. 24 illustrates a graphical user interface presenting a rendition of the results of a query pursuant to the query table of FIG. 23.
Figure 25:
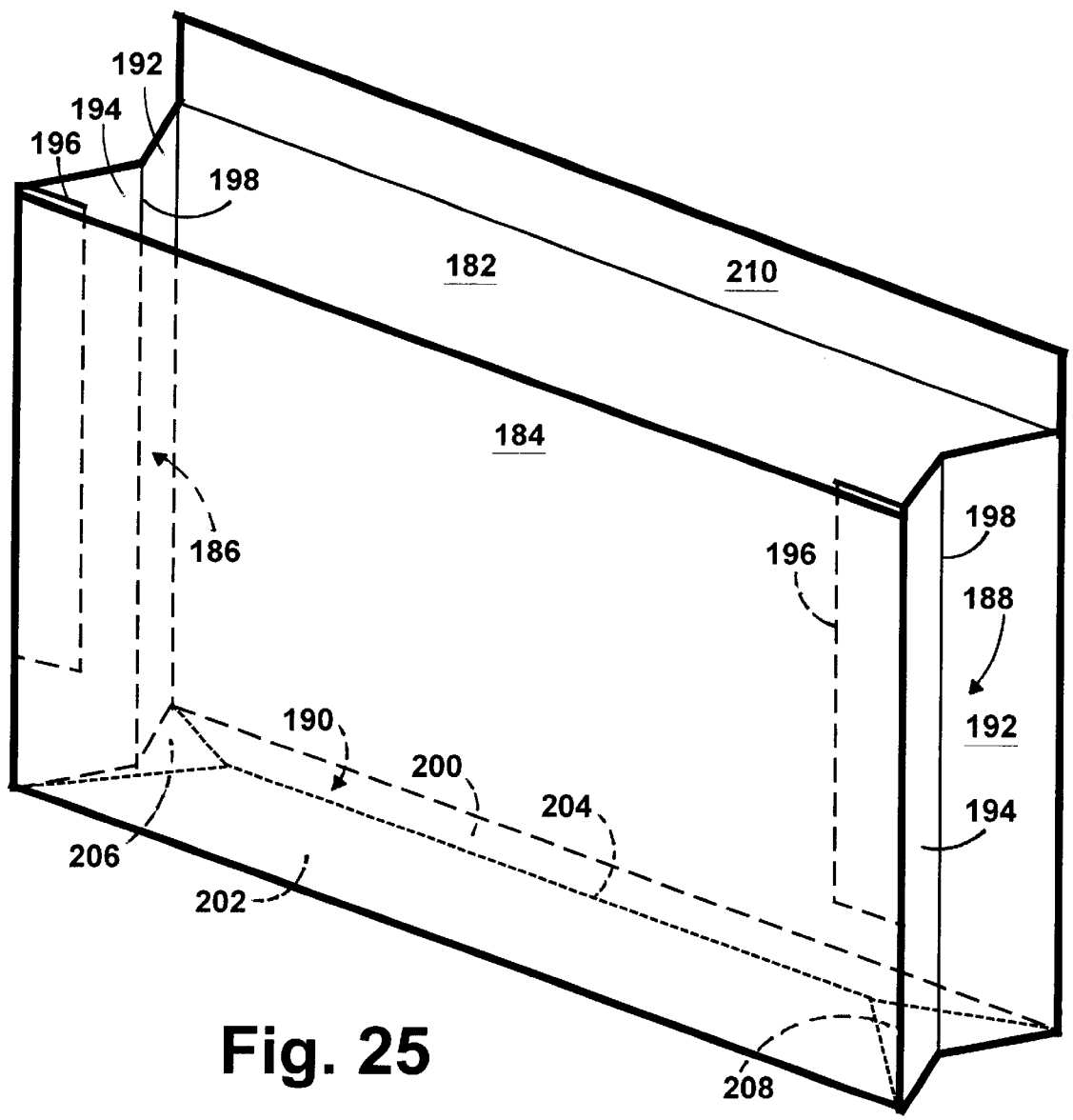
FIG. 25 illustrates a file pocket that is well adapted for receiving and securing batches of paper documents that have been scanned or other physical objects that have been photographed pursuant to the present invention.

The Query of FIGS. 23 and 24

FIG. 23 shows a Query Table 172 and FIG. 24 shows a graphical user interface 174, which demonstrate the retrieval, from an electronic form 176, of an electronic document 178 and the precise location 180 of a corresponding physical document.

Practical Choices of Physical Repositories—FIGS. 25–31

The physical repositories of the present invention may take various forms. Their choice involves a trade-off among security, cost, and convenience. A folder consisting simply of two flaps is low in cost and convenient to use for the reception of a limited batch of loose random paper documents. However, filling and stacking a series of such folders in a box or other secondary repository, or retrieving such a folder from a box of such folders, as a practical matter, may not provide sufficient security to maintain the integrity of a loose stream of important documents, particularly if not handled with relative care. For greater security but higher cost, it may desirable to provide a depository in the form of a pocket, which totally encompasses the bottom and sides of a sequence of randomly inserted papers, and a cover to provide a complete enclosure. However, it has been found convenient to omit the cover in order to simplify initial insertion and possible later retrieval of a limited batch of loose random documents, particularly when the pocket is one of many stacked in a box with a cover. There follow two implementations.

One preferred physical system incorporates a particular type of file pocket, which is well known in the art, but which is modest in cost compared to many other file pocket types. This preferred file pocket is shown in FIGS. 25 through 29. This file pocket has a back panel 182, a front panel 184, a pair of inwardly directed side gussets 186, 188, and a bottom gusset 190. Each side gusset includes a first fold 192, which continues inwardly from back panel 182, a second fold 194 which continues outwardly from the first fold, and a third fold 196, which continues inwardly from the second fold and is cemented to front panel 184. Folds 192 and 194 are joined by an inward crease 198 that is parallel to the adjacent side edges of the front and rear panels. Bottom gusset 190 includes a first fold 200 that continues forwardly from back panel 182 and a second fold 202 that continues rearward from front panel 184, the two folds being joined along an inward crease 204 that is parallel to the adjacent bottom edges of the front and rear panels. The opposite ends of bottom gusset 190 have V-shaped cutouts 206 and 208 that accommodate the lower ends of side gussets 186, 188. All of these features are stamped and configured from an integral blank sheet of thin cardboard. In use, these file pockets merely need be stacked in a box or on a shelf with minimal concern about loss of documents from batches of documents therein.

Figure 30:
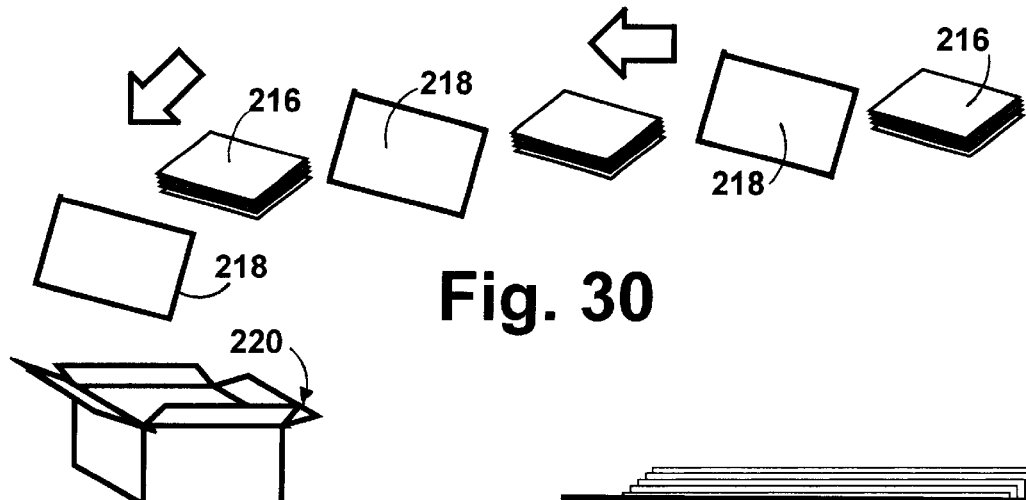
FIG. 30 illustrates an alternative stream of physical batches of paper documents and date/time dividers being stored in a box pursuant to the present invention.
Figure 31:
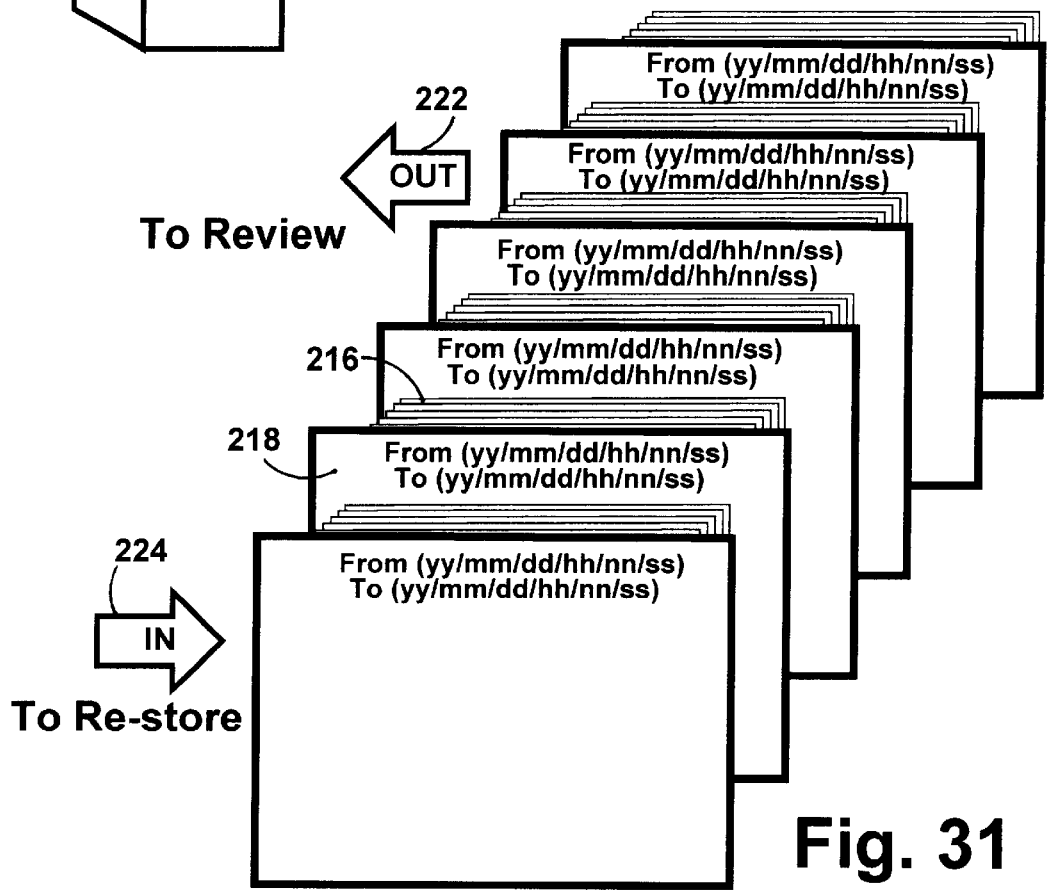
FIG. 31 illustrates optional steps for retrieving and refilling batches of physical documents pursuant to the present invention.

Another system, which is available where low cost is important and security may not be critical, is shown in FIGS. 30 and 31. The physical sub-system comprises simple stacks or batches 210 of papers that are in the order of the date/time sequence of their electro-optical and/or computer generated creation. For convenience, these stacks or batches are separated by dividers such as slip sheets 212, or containers such as simple envelopes (not shown), into sequential date/time intervals. Since the precise location of any original is indicated by its date/time instance, its manual or machine accessibility is immediate and unambiguous. Each of the designated stacks is physically assigned a date/time interval, and each of the included images is electronically assigned a date/time entry within that interval.

The integrity of any designated stack is maintained by monitoring the physical storage and retrieval of any processed document to and from that stack. The operation is such that scanning a series of randomly collected documents produces, interactively in real time, physical stacks of the processed documents and electronic groups of corresponding images and other electronic documents.

In the illustrated embodiment, the physical documents of each batch are stacked from bottom-to-top or rear-to-front. The batches are separated by slip sheets, the foremost one of which is marked with visual indicia that specify at least a date/time instance that is no earlier than the foremost paper document in the date/time interval that it delineates. Thus, each batch is physically located in a physical repository that is located between a pair of slip sheets. Each of the electronic documents is identified by electronic indicia of a date/time entry within that interval. After a batch is removed from its sequence of batches for review, as at 222, it may be replaced at the front of the sequence, as at 224. In this case, the slip sheet is marked with the date of the replacement and the electronic documents corresponding to the relevant physical documents are designated with additional indicia that reflect the change in physical location.

In an alternative embodiment, physical documents of each batch are stacked from top-to-bottom or front-to-rear. The batches are separated by slip sheets, the rearmost one of which is marked with visual indicia that specify at least a date/time instance that is no later than the rearmost paper document in the date/time interval that it delineates. Each of the electronic documents is identified by electronic indicia of a date/time entry within that interval. After a batch is removed from its sequence of batches for review, it may be replaced at the end of the sequence. In this case, the slip sheet is marked with the date of the replacement and the electronic documents corresponding to the relevant physical documents are designated with additional indicia that reflect the change in physical location.

OPERATION

Pursuant to the present invention, at each geographical location: (1) electro-optically generated electronic documents are produced by scanning newly received paper documents at random, and computer generated electronic documents are produced at the distributed work stations or the distributed servers by newly received fax or e-mail documents, all in date/time sequence; (2) any original paper or other hard documents to be saved are stored in date/time sequence, and (3) the images are processed and organized to provide the electronic equivalent of organized files of paper documents. The result is an interactive combination of electronic and physical sub-systems that operate in the following manner. The physical documents are arranged in batches that are stacked in the secondary depositories, i.e. folders and boxes. Each of the batches of hard documents corresponds to a limited range of successive date/time instances and each of the secondary depositories is marked with visual indicia matching this limited range. Scattered through the various batches of hard documents are selected hard documents that are related logically by selected indicia other than date/time. The master electronic system computes and retrieves requested subsets of the electronic images corresponding to these selected hard documents.

Electronic image documents and electronic work documents are acquired or produced to provide one or more real time sequences of electronic documents in one or more real time sequences of date/time instances. Acquired or produced physical documents simply are added to the front (or the back) of one or more cumulative physical stacks. The resulting electronic records uniquely identify the physical locations of the physical documents and the electronic locations of the electronic documents, both in terms of their associated date/time instances. These date/time instances guarantee that virtual sets of related physical documents may be readily located and conveniently retrieved, and that corresponding sets of related electronic documents may be immediately displayed and suitably reported. Pursuant to any particular archive policy, these date/time instances guarantee the joint destruction of corresponding physical and electronic documents that have been received and/or created prior to any selected date.

What is claimed is:

1. A system for processing corresponding pairs of original paper documents and resulting electronic images, said system comprising:

(a) a scanner for producing said resulting electronic images from said original paper documents to provide said pairs in an arbitrary real time sequence;

(b) each pair being automatically specified by a unique date/time identifier;

(c) a physical storage for containing at least one physical collection of said paper documents substantially in said real time sequence;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents substantially in said real time sequence;

(l) said physical containers being uniquely marked with visual media designating ranges of said date/time identifiers; and (m) paper documents of different ones of said restricted virtual groups being intermingled physically throughout said physical containers.

2. The system of claim 1 wherein said date/time identifiers specify seconds.

3. A method of processing corresponding pairs of original paper documents and resulting electronic images, said method comprising the steps of:

(a) producing said resulting electronic images from said original paper documents by scanning to provide said pairs in an arbitrary real time sequence;

(b) automatically specifying each pair by a unique date/time identifier;

(c) storing in a physical repository at least one physical collection of said paper documents substantially in said real time sequence;

(d) each of said paper documents in said physical collection being logically classified by a date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by a date/time identifier with the date/time identifiers of the other electronic images in said electronic collection;

(i) said electronic images in said electronic collection being logically classified by said other identifiers into restricted image groups;

(j) digitally recording said date/time sequence and selectively presenting said restricted image groups;

(k) said physical repository having a plurality of physical containers for holding said paper documents substantially in said date/time sequence; and (l) marking said physical containers with physical media designating ranges of said date/time identifiers.

4. A document storage and retrieval system comprising a physical system for filing a sequence of paper documents, a scanner for converting said sequence of paper documents to a sequence of electronic images at a sequence of date/time instances that specify seconds, and an electronic system for filing said sequence of electronic images, each one of said date/time instances uniquely designating a matched pair of one of said paper documents and one of said electronic images:

(a) said physical system including a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting an electronic table representing a grid containing rows of electronic records and columns of electronic fields, said electronic fields including a ONE electronic field and a plurality of MANY electronic fields, said ONE electronic field including a sequence of date/time entries that designate a corresponding sequence of said paper documents and said electronic images, said MANY electronic fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation, the location in said secondary repositories of any one paper document being indicated by a record that includes the date/time instance by which said one paper document is uniquely identified, said logical groups of said electronic images being identified by logical groups of said electronic records so as to be adapted for immediate electronic compilation.

5. The system of claim 4 wherein said primary depository is a box and imprinted on said box are visual indicia specifying a limited date/time range of physical documents therein.

6. The system of claim 4 wherein each of said secondary depositories is a folder and imprinted on said folder are visual indicia specifying a limited date/time range of physical documents therein.

7. The system of claim 4 wherein said date/time in part specifies seconds.

8. The system of claim 4 wherein said digital computer automatically generates electronic date/time indicia in said ONE field at each of said date/time instances.

9. A database system comprising a physical system and an electronic system that process a plurality of pairs of paper documents and electronic images:

(a) the paper document and the electronic image of each of said pairs being substantially identical visually;

(b) a scanner for producing said electronic images from said paper documents to provide said pairs in an arbitrary real time sequence;

(c) each of said pairs being uniquely identified by one of a succession of date/time entries in said primary field;

(d) said electronic system presenting an electronic table representing a grid containing rows of electronic records and columns of electronic fields;

(e) at least one of said fields being a primary field characterized by a date/time data type;

(f) at least a plurality of other fields being secondary fields characterized by at least another data type;

(g) said physical system including a primary container and a plurality of secondary containers therein;

(h) a physical collection of said paper documents being deposited in said plurality of secondary containers;

(i) each of said pairs being designated by one of said records;

(j) said paper documents in said physical collection being logically classified by said other identifiers into restricted virtual groups;

(k) paper documents of different ones of said restricted virtual groups being intermingled physically throughout said physical collection;

(l) the physical location of a particular document being indicated by a particular one of said date/time instances;

(m) electronic storage for containing said collection of said electronic images; and (n) a digital processor for recording said date/time sequence and for presenting said restricted image groups.

10. A digital system for producing a collection of electronic images from a collection of paper documents in an arbitrary date/time sequence of transactions, the paper documents and electronic images thereby being matched in pairs:

(a) each pair being uniquely identified by one of said date/time sequence of transactions;

(b) different pairs being classified by different contents in different logical groups;

(c) a primary physical container and a plurality of secondary physical containers therein;

(d) ranges of said paper documents being deposited in said secondary physical containers;

(e) said ranges being uniquely identified by corresponding ranges of said date/time sequence;

(f) said secondary physical containers being marked with physical indicia corresponding to said ranges of said date/time sequence;

(g) an electronic table representing a grid containing rows of electronic records and columns of at least a primary electronic field and a plurality of secondary electronic fields;

(h) entries in said primary field identifying said date/time sequence of transactions;

(i) entries in said secondary fields identifying said different logical groups;

(j) paper documents identifying said different logical groups being intermingled in said secondary physical containers;

(k) logical groups of electronic images being organized by said entries in said secondary fields for electronic presentation;

(l) the date/time entry for any electronic image indicating the physical location in said secondary containers of the paper document represented thereby.

11. The digital system of claim 10 wherein said date/time sequence specifies seconds.

12. A digital process for producing a collection of electronic images from a collection of paper documents in an arbitrary date/time sequence of transactions, the paper documents and electronic images thereby being matched in pairs (a) uniquely identifying each pair by one of said date/time sequence of transactions;

(b) different contents classifying different pairs in different logical groups;

(c) depositing ranges of said paper documents in a plurality of secondary physical containers;

(d) depositing said plurality of secondary physical containers in a primary physical container;

(e) automatically identifying said ranges of paper documents by corresponding ranges of said date/time sequence;

(f) marking said secondary physical containers with physical indicia corresponding to said ranges of said date/time sequence;

(g) creating an electronic table representing a grid containing rows of electronic records and columns of at least a primary electronic field and a plurality of secondary electronic fields;

(h) inserting entries in said primary field identifying said date/time sequence of transactions;

(i) inserting entries in said secondary fields identifying said different logical groups;

(j) intermingling paper documents identifying said different logical groups in said secondary physical containers;

(k) organizing logical groups of electronic images by said entries in said secondary fields for electronic presentation;

(l) the date/time entry for any electronic image indicating the physical location in said secondary containers of the paper document represented thereby.

13. The digital process of claim 12 wherein said date/time sequence specifies seconds.

14. A document storage and retrieval system comprising a physical system for filing a sequence of paper documents, a scanner for converting said sequence of paper documents to a sequence of electronic images at a sequence of date/time instances, and an electronic system for filing said sequence of electronic images, each one of said date/time instances uniquely designating a matched pair of one of said paper documents and one of said electronic images:

(a) said physical system including a primary physical repository and a plurality of secondary physical repositories therein, selected ranges of said sequence of paper documents corresponding to selected ranges of said date/time instances, said selected ranges of said sequences of paper documents being contained by selected ones of said secondary physical repositories, said selected ones of said secondary physical repositories being visually marked with physical indicia corresponding to said selected ranges of said date/time instances;

(b) said electronic system presenting an electronic table representing a grid containing rows of electronic records and columns of electronic fields, said electronic fields including a primary electronic field and a plurality of secondary electronic fields, said primary field including a sequence of date/time entries that designate a corresponding sequence of said paper documents and said electronic images, said secondary fields including arrangements of other entries that designate corresponding arrangements of logical groups of said paper documents and logical groups of said electronic images;

(c) said logical groups of said paper documents including virtual collections of said paper documents that are intermingled throughout said secondary repositories so as to be unadapted for immediate physical compilation, the location in said secondary repositories of any one paper document being indicated by a record that includes the date/time instance by which said one paper document is uniquely identified, said logical groups of said electronic images being identified by logical groups of said electronic records so as to be adapted for immediate electronic compilation.

15. The document storage and retrieval system of claim 14 wherein said date/time instances specify seconds.

16. A document storage system comprising:

(a) a physical system and an electronic system for storing pairs of paper documents and electronic images;

(b) each of said pairs being specified by a unique date/time identifier;

(c) a physical storage for containing at least one physical collection of said paper documents;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents in said date/time sequence;

(l) said physical containers being uniquely marked with visual media designating ranges of said date/time identifiers;

(m) paper documents of different ones of said restricted virtual groups being intermingled physically throughout said physical containers.

17. The document storage system of claim 16 wherein both said physical system and said electronic system provide matched archival termination indicia, which enable concomitant disposal of physical documents and electronic images bearing the same date/time termination indicia.

18. A system for processing corresponding pairs of original paper documents and resulting electronic images, said system comprising:

(a) a physical system and an electronic system;

(b) a scanner and a printer, both operatively connected to said physical system and said electronic system;

(c) said physical system having a primary physical repository and a plurality of secondary physical repositories therein;

(d) said secondary physical repositories holding selected sequences of said physical documents corresponding to selected ranges of date/time instances;

(e) selected secondary physical repositories receiving selected ranges of said selected sequences of said physical documents;

(f) selected primary repositories receiving selected ranges of said selected secondary repositories;

(g) said selected physical repositories being visually marked with physical indicia corresponding to selected ranges of date/time instances;

(h) said electronic system containing a database that includes a plurality of electronic tables, each representing a grid of rows of electronic records and columns of electronic fields;

(i) said electronic fields including at least one primary electronic field and a plurality of secondary electronic fields;

(j) said primary field including entries of said date/time instances that designate corresponding logical groups of paper documents and corresponding logical groups of electronic documents;

(k) said secondary fields including other entries that designate corresponding logical groups of the paper documents and of the electronic documents;

(l) said primary field and said secondary field constituting an interactive combination of electronic records, which specify the precise physical locations of selected paper documents in terms of their date/time instances;

(m) said selected date/time instances designating selected logical groups of said physical documents and selected logical groups of electronic documents, said selected logical groups of the paper documents being virtual collections that are intermingled throughout said secondary repositories so as to be unadapted for immediate physical compilation, said selected logical groups of electronic documents being adapted for immediate electronic compilation and presentation.

19. The system of claim 18 wherein said primary depositories include file folders.

20. The system of claim 18 wherein said primary depositories include file pockets.

21. The system of claim 18 wherein said selected sequences of said physical documents are in the order of the last-filed-physical-document-in-front.

22. The system of claim 18 wherein said selected sequences of said physical documents are in the order of the last-filed-physical-document-in-back.

23. The system of claim 18 wherein the earliest of the physical sequence of paper documents and the earliest of the electronic sequence of electronic images have the said date/time identifier.

24. The system of claim 18 wherein said secondary depositories include boxes.

25. The system of claim 18 wherein said secondary depositories include shelves.

26. The system of claim 18 wherein said secondary depositories include at least a room.

27. The system of claim 18 wherein said electronic files include electronic image files and electronic work files.

28. The system of claim 18 wherein the content of a selected resulting electronic image corresponds to a part of the corresponding original paper document.

29. A system for processing multiple streams of original paper documents that are assigned to said multiple streams by predetermined criteria, each of said streams resulting in corresponding pairs of said original paper documents and resulting electronic images, said system comprising:

(a) electro-optic means for producing said resulting electronic images from said original paper documents to provide said multiple streams of said pairs in an arbitrary real time sequence;

(b) each of said pairs being automatically specified by a unique date/time identifier;

(c) a physical storage for containing at least one physical collection of said paper documents substantially in said real time sequence;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents substantially in said real time sequence;

(l) said physical containers being uniquely marked with visual media designating ranges of said date/time identifiers; and (m) paper documents of different ones of said restricted virtual groups being intermingled physically throughout said physical containers.

30. The system of claim 29 wherein said date/time identifiers specify seconds.

31. The system of claim 29 wherein said electro-optic means is a scanner.

32. The system of claim 29 wherein said electro-optic means is a camera.

33. A network system comprising:
(a) a plurality of distributed systems and a master system;
(b) said distributed systems being at different geographical locations;
(c) said distributed systems including distributed physical systems and distributed electronic systems;
(d) said master system being located at a particular geographical location;
(e) said master system including a master physical system and a master electronic system;
(f) said distributed physical systems including scanners for processing random sequences of paper documents to produce sequences of electronic image documents in sequences of date/time instances;
(g) said master physical system including a master physical depository for storing said random sequences of paper documents in storage locations that are uniquely identified by said date/time instances;
(h) said master electronic system including a master electronic database for storing said sequences of electronic image documents in reference to said date/time instances;
(i) said paper documents in said storage locations being logically classified in terms of said date/time instances;
(j) said paper documents in said sequences of paper documents being logically classified by other identifiers into restricted virtual groups;
(k) paper documents of different ones of said restricted virtual groups being intermingled physically throughout said sequences of paper documents;
(l) said distributed electronic systems presenting said electronic image documents in restricted electronic groups that correspond to said restricted virtual groups.

34. The network system of claim 33 wherein said date/time instances specify seconds.

35. A network system comprising:
(a) a plurality of distributed networks and a master network;
(b) said distributed networks being at different geographical locations;
(c) said distributed networks including distributed physical systems and distributed electronic systems;
(d) said master network being located at a particular geographical location;
(e) said master system including a master physical system and a master electronic system;
(f) said distributed physical networks including scanners for processing random sequences of paper documents to produce sequences of electronic image documents in sequences of date/time instances;
(g) said master physical network including a master physical depository for storing said random sequences of paper documents in a collection of storage locations that are uniquely identified by said date/time instances;
(h) said master electronic system including a master electronic database for storing said sequences of electronic image documents in reference to said date/time instances;
(i) said paper documents in said storage locations being logically classified in terms of said date/time instances;
(j) said paper documents in said physical collection being logically classified by other identifiers into restricted virtual groups;
(k) paper documents of different ones of said restricted virtual groups being intermingled physically throughout said sequences of paper documents;
(l) said distributed electronic systems presenting said electronic image documents in restricted electronic groups that correspond to said restricted virtual groups.

36. The network system of claim 35 wherein said date/time instances specify seconds.

37. A network system for processing corresponding pairs of original paper documents and resulting electronic images, said system comprising:
(a) a scanner for producing said resulting electronic images from said original paper documents to provide said pairs in an arbitrary real time sequence;
(b) each pair being automatically specified by a unique date/time identifier;
(c) a physical storage for containing at least one physical collection of said paper documents substantially in said real time sequence;
(d) each of said paper documents in said physical collection being logically classified by said date/time identifier with the date/time identifiers of the other paper documents in said physical collection;
(e) said paper documents in said physical collection being logically classified by other identifiers into restricted virtual groups;
(f) paper documents of different ones of said restricted virtual groups being intermingled physically throughout said physical collection;
(g) an electronic storage for containing at least one electronic collection of said electronic images;
(h) each of said electronic images in said electronic collection being logically classified by said date/time identifier with the date/time identifiers of the other electronic images in said electronic collection;
(i) said electronic images in said electronic collection being logically classified by said other identifiers into restricted image groups;
(j) digital processing means for recording said date/time sequence and for presenting said restricted image groups;
(k) said physical storage having a plurality of physical containers for holding said paper documents substantially in said real time sequence;
(l) said physical containers being uniquely marked with visual media designating ranges of said date/time identifiers;
(m) paper documents of different ones of said restricted virtual groups being intermingled physically throughout said physical containers.

38. A method of processing corresponding pairs of original paper documents and resulting electronic images, said system comprising:
(a) producing said resulting electronic images from said original paper documents by scanning to provide said pairs in an arbitrary real time sequence;
(b) automatically specifying each pair by a unique date/time identifier;
(c) storing in a physical repository at least one physical collection of said paper documents substantially in said real time sequence;
(d) each of said paper documents in said physical collection being logically classified by a date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by a date/time identifier with the date/time identifiers of the other electronic images in said electronic collection;

(i) said electronic images in said electronic collection being logically classified by said other identifiers into restricted image groups;

(j) digitally recording said date/time sequence and selectively presenting said restricted image groups;

(k) said physical repository having a plurality of physical containers for holding said paper documents substantially in said date/time sequence; and (l) marking said physical containers with physical media designating ranges of said date/time identifiers.

39. A network system comprising:

(a) a plurality of distributed systems and a master system;

(b) said distributed systems being at different geographical locations;

(c) said distributed systems including distributed physical systems and distributed electronic systems;

(d) said master system being located at a particular geographical location;

(e) said master system including a master physical system and a master electronic system;

(f) said distributed physical systems including scanners for processing random sequences of paper documents to produce sequences of electronic image documents in sequences of date/time instances;

(g) said master physical system including a master physical depository for storing said random sequences of paper documents in storage locations that are uniquely identified by said date/time instances;

(h) said master electronic system including a master electronic database for storing said sequences of electronic image documents in reference to said date/time instances;

(i) said paper documents in said storage locations being logically classified in terms of said date/time instances;

(e) said paper documents in said sequences of paper documents being logically classified by other identifiers into restricted virtual groups;

(f) paper documents of different ones of said restricted virtual groups being intermingled physically throughout said sequences of paper documents;

(g) said distributed electronic systems presenting said electronic image documents in restricted electronic groups that correspond to said restricted virtual groups.

40. The network system of claim 39 wherein said date/time instances specify seconds.

41. A network system comprising:

(a) a plurality of distributed networks and a master network;

(b) said distributed networks being at different geographical locations;

(c) said distributed networks including distributed physical systems and distributed electronic systems;

(d) said master network being located at a particular geographical location;

(e) said master system including a master physical system and a master electronic system;

(f) said distributed physical networks including scanners for processing random sequences of paper documents to produce sequences of electronic image documents in sequences of date/time instances;

(g) said master physical network including a master physical depository for storing said random sequences of paper documents in a collection of storage locations that are uniquely identified by said date/time instances;

(h) said master electronic system including a master electronic database for storing said sequences of electronic image documents in reference to said date/time instances;

(i) said paper documents in said storage locations being logically classified in terms of said date/time instances;

(e) said paper documents in said physical collection being logically classified by other identifiers into restricted virtual groups;

(f) paper documents of different ones of said restricted virtual groups being intermingled physically throughout said sequences of paper documents;

(g) said distributed electronic systems presenting said electronic image documents in restricted electronic groups that correspond to said restricted virtual groups.

42. The network system of claim 41 wherein said date/time instances specify seconds.

43. A network system for processing corresponding pairs of original paper documents and resulting electronic images, said system comprising:

(a) a scanner for producing said resulting electronic images from said original paper documents to provide said pairs in an arbitrary real time sequence;

(b) each pair being automatically specified by a unique date/time identifier;

(c) a physical storage for containing at least one physical collection of said paper documents substantially in said real time sequence;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents substantially in said real time sequence;

(l) said physical containers being uniquely marked with visual media referring to ranges of said date/time identifiers;

(m) paper documents of different ones of said restricted virtual groups being intermingled physically throughout said physical containers.

44. A database for storing and retrieving physical documents and electronic documents, said database comprising:

(a) a physical system and an electronic system;

(b) said physical system and said electronic system providing a logical sequence of pairs of said physical documents and said electronic documents;

(c) said pairs being identified by a logical sequence of the date/time instances of their creation;

(d) the physical document and the electronic document of each of said pairs being substantially identical visually;

(e) selected pairs of said physical documents and said electronic documents containing the records of a selected class from a universe of classes;

(e) said physical system containing a master set of said physical documents divided into a plurality of subsets of said physical documents;

(f) the physical sequence of said physical documents substantially corresponding to said logical sequence of said date/time instances of their creation;

(g) said records of said selected class thereby being intermingled with each other within said plurality of said subsets of said physical documents;

(h) separators between said subsets having visual markings that connote the ranges of said date/time instances of the physical documents in said subsets;

(i) said electronic system presenting a plurality of electronic tables, each of said tables representing a grid containing rows of electronic records and columns of electronic fields;

(j) at least one of said fields being a first primary field characterized by a date/time data type, selected entries in said first primary field identifying selected date/time instances;

(k) at least another of said fields being a second primary field characterized by another data type, selected entries in said second primary field identifying selected classes from said universe of classes;

(l) said physical system being operative to enable location of selected physical documents that identify a selected class, said selected physical documents constituting a virtual file of selected records associated with said selected class;

(m) said electronic system including a digital processor for presenting electronic sets of selected electronic documents;

(n) said electronic system being operative to enable presentation of selected electronic documents that identify a selected class, said selected electronic documents constituting an assembled electronic file of selected records associated with said selected class;

(o) the physical location of any particular one of said physical documents being indicated by its date/time instance as presented by said electronic tables.

45. The system of claim 44 wherein said separators include slip sheets.

46. The system of claim 44 wherein said separators include file folders.

47. The system of claim 44 wherein said separators include file pockets.

48. The system of claim 44 wherein said date/time instances in part specify seconds.

49. A system for processing paper documents and electronic documents, said paper documents including original paper documents and computer generated paper documents, said electronic documents including electronic image documents and electronic work documents, said paper documents and said electronic documents including corresponding pairs of original paper documents and resulting electronic images, said system comprising:

(a) a scanner for producing said resulting electronic images from said original paper documents to provide said pairs in an arbitrary real time sequence;

(b) each pair being automatically specified by a unique date/time identifier;

(c) a physical storage for containing at least one physical collection of said paper documents substantially in said real time sequence;

(d) each of said paper documents in said physical collection being logically classified by said date/time identifier with the date/time identifiers of the other paper documents in said physical collection;

(e) said paper documents in said physical collection being logically classified by other identifiers into restricted virtual groups;

(f) paper documents of different ones of said restricted virtual groups being intermingled physically throughout said physical collection;

(g) an electronic storage for containing at least one electronic collection of said electronic images;

(h) each of said electronic images in said electronic collection being logically classified by said date/time identifier with the date/time identifiers of the other electronic images in said electronic collection;

(i) said electronic images in said electronic collection being logically classified by said other identifiers into restricted image groups;

(j) digital processing means for recording said date/time sequence and for presenting said restricted image groups;

(k) said physical storage having a plurality of physical containers for holding said paper documents substantially in said real time sequence;

(l) said physical containers being uniquely marked with visual media designating ranges of said date/time identifiers; and (m) paper documents of different ones of said restricted virtual groups being intermingled physically throughout said physical containers.

50. The system of claim 49 wherein said date/time identifiers specify seconds.

* * * * *